(12) United States Patent
Yoshida

(10) Patent No.: US 8,654,378 B2
(45) Date of Patent: Feb. 18, 2014

(54) IMAGE-PROCESSING APPARATUS AND SERVER DEVICE

(75) Inventor: Okihisa Yoshida, Kawanishi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 945 days.

(21) Appl. No.: 12/639,343

(22) Filed: Dec. 16, 2009

(65) Prior Publication Data

US 2010/0149592 A1 Jun. 17, 2010

(30) Foreign Application Priority Data

Dec. 16, 2008 (JP) ................................. 2008-319704

(51) Int. Cl.
*G06F 3/12* (2006.01)
*G03G 15/00* (2006.01)
*G06F 3/00* (2006.01)

(52) U.S. Cl.
USPC ............ 358/1.15; 399/81; 715/744; 715/745; 715/746; 715/747

(58) Field of Classification Search
None
See application file for complete search history.

(56) References Cited

U.S. PATENT DOCUMENTS

| | | | | |
|---|---|---|---|---|
| 6,446,096 | B1 * | 9/2002 | Holland et al. | 715/234 |
| 7,010,761 | B2 | 3/2006 | Chatani et al. | |
| 7,231,432 | B2 * | 6/2007 | Aoki | 709/219 |
| 8,001,470 | B1 * | 8/2011 | Chen et al. | 715/714 |
| 8,132,107 | B2 * | 3/2012 | Honma | 715/740 |
| 2002/0120778 | A1 * | 8/2002 | Clapper et al. | 709/246 |
| 2002/0122070 | A1 * | 9/2002 | Watanabe | 345/810 |
| 2003/0011633 | A1 * | 1/2003 | Conley et al. | 345/762 |
| 2003/0187958 | A1 * | 10/2003 | Aoki | 709/219 |
| 2004/0070630 | A1 * | 4/2004 | Nagoshi et al. | 345/810 |
| 2006/0077423 | A1 | 4/2006 | Mathieson et al. | |
| 2007/0283295 | A1 * | 12/2007 | Honma | 715/847 |
| 2008/0043137 | A1 | 2/2008 | Rikima et al. | |
| 2008/0074693 | A1 | 3/2008 | Hashimoto et al. | |

FOREIGN PATENT DOCUMENTS

| | | |
|---|---|---|
| JP | 2004-172718 | 6/2004 |
| JP | 2006-127503 A | 5/2006 |
| JP | 2006-277005 | 10/2006 |
| JP | 2006-523332 | 10/2006 |
| JP | 2007-280028 | 10/2007 |
| JP | 2008-037105 | 2/2008 |
| JP | 2008-083809 | 4/2008 |
| JP | 2008-086028 | 4/2008 |

OTHER PUBLICATIONS

Office Action (Notification of Reason(s) for Refusal) dated Aug. 31, 2010, issued in the corresponding Japanese Patent Application No. 2008-319704, and an English Translation thereof.

* cited by examiner

*Primary Examiner* — King Poon
*Assistant Examiner* — Vincent Peren
(74) *Attorney, Agent, or Firm* — Buchanan Ingersoll & Rooney PC

(57) ABSTRACT

The image-processing apparatus includes: a communication interface unit; a user interface display unit which is arranged to provide information to a user; a user interface input unit provided with a hardware-key which is arranged to receive an input from the user; a web browser which is arranged to acquire page data from a web server, structure a display screen based upon the page data, and display the display screen on the user interface display unit; a hardware-key function assignor which is arranged to determine a function to be assigned to the hardware-key based upon the page data; and a hardware-key control unit which is arranged to control the hardware-key in accordance with the determination of the hardware-key function assignment by the hardware-key function assignor.

19 Claims, 22 Drawing Sheets

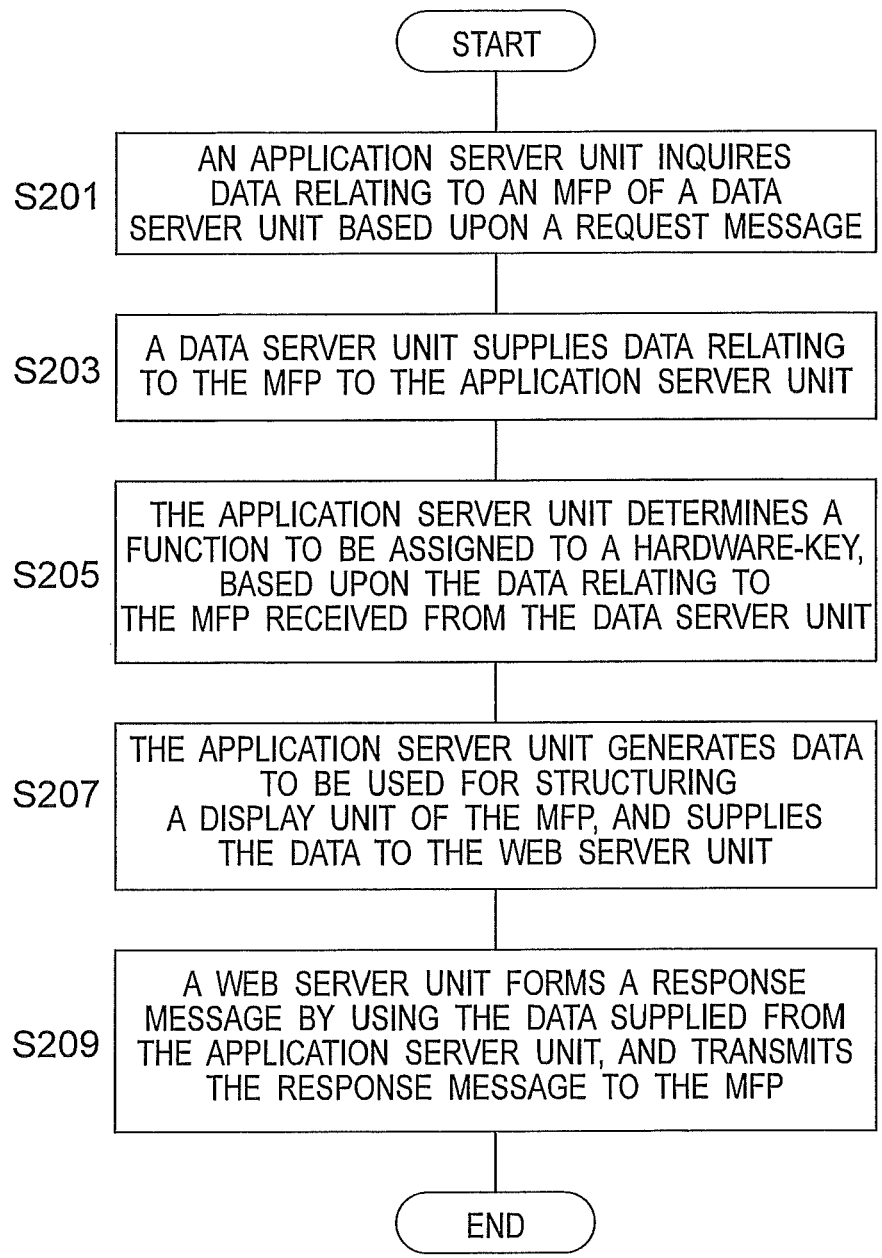

Fig.10

| LOOK-UP TABLE FOR REFERENCING AN ASSIGNING TABLE BASED UPON A URL ||
|---|---|
| URL | HARDWARE-KEY ASSIGNING TABLE |
| www.konicaminolta.jp/start.html | ASSIGNING TABLE 1 |
| www.konicaminolta.jp/scanftp.html | ASSIGNING TABLE 2 |
| www.konicaminolta.jp/sendmail.html | ASSIGNING TABLE 3 |

Fig.11

| EXAMPLE OF ASSIGNING TABLE 1 ||
|---|---|
| HARDWARE-KEY | FUNCTION |
| NUMERIC KEY "2" | SCROLL UPWARD |
| NUMERIC KEY "4" | SCROLL LEFTWARD |
| NUMERIC KEY "6" | SCROLL RIGHTWARD |
| NUMERIC KEY "8" | SCROLL DOWNWARD |
| START KEY | START A COPY JOB |
| STOP KEY | CEASE A RUNNING JOB |

Fig. 12

| EXAMPLE OF ASSIGNING TABLE 2 | | |
|---|---|---|
| HARDWARE-KEY | REFERENCED CONDITION | FUNCTION |
| NUMERIC KEY "1" | MOUNTED DOCUMENT EXISTS | DISABLED |
| NUMERIC KEY "1" | NO MOUNTED DOCUMENT EXISTS | INPUT A CHARACTER BELONGING TO THE "A" COLUMN OF THE KANA SYLLABARY |
| NUMERIC KEY "2" | MOUNTED DOCUMENT EXISTS | DISABLED |
| NUMERIC KEY "2" | NO MOUNTED DOCUMENT EXISTS | INPUT A CHARACTER BELONGING TO THE "KA" COLUMN OF THE KANA SYLLABARY |
| NUMERIC KEY "3" | MOUNTED DOCUMENT EXISTS | DISABLED |
| NUMERIC KEY "3" | NO MOUNTED DOCUMENT EXISTS | INPUT A CHARACTER BELONGING TO THE "SA" COLUMN OF THE KANA SYLLABARY |
| ... | ... | ... |
| ... | ... | ... |
| START KEY | MOUNTED DOCUMENT EXISTS | START A JOB OF SCANNING AND UPLOADING |
| START KEY | NO MOUNTED DOCUMENT EXISTS | EXECUTE A KANA CHARACTER /CHINESE CHARACTER CONVERSION |
| STOP KEY | MOUNTED DOCUMENT EXISTS | BACKSPACE |
| STOP KEY | NO MOUNTED DOCUMENT EXISTS | CEASE A RUNNING JOB |

Fig.14

```
<html>
<meta http-equiv="Content-type" content="text/html; charset=Shift_JIS">
 <head>
  <title>WORKFLOW</title>

<!--
    <commandtable class=km>
    <hdkey key="OK" attribute="input" type="submit" />
    <hdkey key="Stop" attribute="input" type="reset" />
    <hdkey key="1" attribute="content" type="back" />
    <hdkey key="3" attribute="content" type="forward" />
    </commandtable>
 -->

</head>
 <body>
   <p>SPECIFY A FILE TO BE TRANSMITTED</p>

<div style="border: 1px solid gray; margin-left: 10px; width: 400px; height: 50px; padding: 10px;">
    FILE TO BE TRANSFERRED:<input type="file"> <input type="submit" value="OK"> <input type="reset" value="CANCEL">
   </div>

<a href="next.html">NEXT</a>
 </body>
</html>
```

The commandtable block is labeled 57, and the entire head section is labeled 51.

*Fig.15*

```
<?xml version="1.0" encoding="Shift_JIS"?>
<!DOCTYPE html PUBLIC "-//W3C//DTD XHTML 1.0 Strict//EN"
    "http://www.w3.org/TR/xhtml1/DTD/xhtml1-strict.did">
<html xmlns="http://www.w3.org/1999/xhtml" xml:lang="ja" lang="ja">
 <head>
  <title>WORKFLOW</title>

<command class=content>⎫
    <input  type="file" />    ⎪
    <input  type="submit" />  ⎬ 53x
    <input  type="reset" />   ⎪
    </command>                ⎭

<operate class=content>   ⎫
    <hdkey  key="null" />     ⎪
    <hdkey  key="OK" />       ⎬ 55x
    <hdkey  key="Stop" />     ⎪
    </operate>                ⎭

</head>
 <body>
  <p>SPECIFY A FILE TO BE TRANSMITTED</p>

<div style="border: 1px solid gray; margin-left: 10px; width: 400px; height: 50px; padding: 10px;">
    FILE TO BE TRANSFERRED:<input type="file"> <input type="submit" value="OK"> <input type="reset" value="CANCEL"/>
    </div>

<a href="next.html">NEXT</a>
 </body>
</html>
```

*Fig.16*

```
<?xml version="1.0" encoding="Shift_JIS"?>
<!DOCTYPE html PUBLIC "-//W3C//DTD XHTML 1.0 Strict//EN"
   "http://www.w3.org/TR/xhtml1/DTD/xhtml1-strict.did">
<html xmlns="http://www.w3.org/1999/xhtml" xml:lang="ja" lang="ja">
 <head>
  <title>WORKFLOW</title>

<commandtable class=km>
    <hdkey key="OK" attribute="input" type="submit" />
    <hdkey key="Stop" attribute="input" type="reset" />       57x
    <hdkey key="1" attribute="content" type="back" />
    <hdkey key="3" attribute="content" type="forward" />
    </commandtable>

</head>
 <body>
  <p>SPECIFY A FILE TO BE TRANSMITTED</p>

<div style="border: 1px solid gray; margin-left: 10px; width: 400px; height: 50px; padding: 10px;">
    FILE TO BE TRANSFERRED:<input type="file"> <input type="submit" value="OK"> <input type="reset" value="CANCEL">
    </div>

<a href="next.html">NEXT</a>
  </body>
</html>
```

Fig. 17

| CORRESPONDENCE TABLE BETWEEN KEY ATTRIBUTE VALUE (KEYWORD) AND KEY ||
|---|---|
| KEYWORD | HARDWARE-KEY |
| 1 | NUMERIC KEY "1" |
| 2 | NUMERIC KEY "2" |
| 3 | NUMERIC KEY "3" |
| . . . | . . . |
| Start | START KEY |
| Stop | STOP KEY |

Fig. 18

| CORRESPONDENCE TABLE BETWEEN TYPE ATTRIBUTE VALUE (KEYWORD) AND ASSIGNED FUNCTION ||
|---|---|
| KEYWORD | ASSIGNED FUNCTION |
| upscroll | SCROLL UPWARD |
| leftscroll | SCROLL LEFTWARD |
| rightscroll | SCROLL RIGHTWARD |
| downscroll | SCROLL DOWNWARD |
| . . . | . . . |
| forward | MOVE FORWARD |
| back | MOVE BACKWARD |

Fig. 19

CORRESPONDENCE TABLE BETWEEN
TYPE ATTRIBUTE VALUE (KEYWORD) AND ASSIGNED FUNCTION

| ATTRIBUTE VALUE | REFERENCED CONDITION | ASSIGNED FUNCTION |
|---|---|---|
| input \|\| submit | UPLOADING ADDRESS IS NOT INPUTTED YET | DISABLED |
| input \|\| submit | UPLOADING ADDRESS IS INPUTTED | EXECUTE SCANNING AND UPLOADING |
| submit | FILE TO BE TRANSMITTED IS NOT SELECTED YET | DISABLED |
| submit | FILE TO BE TRANSMITTED IS SELECTED | TRANSMIT FILE SELECTED |
| imgsrc1 | IMAGE SOURCE EXISTS | DISABLED |
| imgsrc1 | NO IMAGE SOURCE EXISTS | SELECT FIRST IMAGE SOURCE |
| imgsrc2 | TWO OR MORE IMAGE SOURCES DO NOT EXIST | DISABLED |
| imgsrc2 | TWO OR MORE IMAGE SOURCES EXIST | SELECT SECOND IMAGE SOURCE |
| imgsrc3 | THREE OR MORE IMAGE SOURCES DO NOT EXIST | DISABLED |
| imgsrc3 | THREE OR MORE IMAGE SOURCES EXIST | SELECT THIRD IMAGE SOURCE |
| imgsrcsb | NO SELECTED IMAGE SOURCE EXISTS | DISABLED |
| imgsrcsb | SELECTED IMAGE SOURCE EXISTS | TRANSMIT SELECTED IMAGE SOURCE |

Fig.20

EXAMPLE 1 OF HARDWARE-KEY CONTROL ACCORDING TO
TAGGED ELEMENT (KEYWORD) AND ITS ATTRIBUTE VALUE (KEYWORD)

| DESCRIPTION EXAMPLE | MATTER BEING CONTROLLED |
|---|---|
| hdkey key="2" attribute="content" type="upscroll" | ASSIGN FUNCTION "SCROLL UPWARD" TO NUMERIC KEY "2" |
| hdkey key="4" attribute="content" type="leftscroll" | ASSIGN FUNCTION "SCROLL LEFTWARD" TO NUMERIC KEY "4" |
| hdkey key="6" attribute="content" type="rightscroll" | ASSIGN FUNCTION "SCROLL RIGHTWARD" TO NUMERIC KEY "6" |
| hdkey key="8" attribute="content" type="downscroll" | ASSIGN FUNCTION "SCROLL DOWNWARD" TO NUMERIC KEY "8" |
| hdkey key="3" attribute="content" type="forward" | ASSIGN FUNCTION "MOVE FORWARD" TO NUMERIC KEY "3" |
| hdkey key="1" attribute="content" type="back" | ASSIGN FUNCTION "MOVE BACKWARD" TO NUMERIC KEY "1" |

Fig.21

| EXAMPLE 2 OF HARDWARE-KEY CONTROL ACCORDING TO TAGGED ELEMENT (KEYWORD) AND ITS ATTRIBUTE VALUE (KEYWORD) | |
|---|---|
| DESCRIPTION EXAMPLE | MATTER BEING CONTROLLED |
| hdkey key="1" attribute="input" type="imgsrc1" | ASSIGN FUNCTION "SELECT FIRST IMAGE SOURCE" TO NUMERIC KEY "1" |
| hdkey key="2" attribute="input" type="imgsrc2" | ASSIGN FUNCTION "SELECT SECOND IMAGE SOURCE" TO NUMERIC KEY "2" |
| hdkey key="Start" attribute="input" type="input || submit" | ASSIGN FUNCTION "SCAN AND UPLOAD" TO NUMERIC KEY "6" |

IMAGE-PROCESSING APPARATUS AND SERVER DEVICE

This application is based on an application No. 2008-319704 filed in Japan, the contents of which are hereby incorporated by reference.

BACKGROUND OF THE INVENTION

1. Field of the Invention

The present invention relates to an image-processing apparatus, a server, and an image-processing system including these, and, particularly, relates to an image-processing apparatus which is provided with a browser function, with the browser function being utilized as an user interface, and a server device which provides data in response to a request from the browser of the image-processing apparatus, as well as an image-processing system provided with these.

2. Description of the Related Art

Recent developments in image-processing technique and information-processing technique allow a single image-processing apparatus to have a plurality of functions (such as a copying function, a scanner function, a printer function, a facsimile function and the like). In general, such an image-processing apparatus is referred to as a digital complex machine (hereinafter, referred to simply as "complex machine" or "MFP (MultiFunction Peripheral)"). Normally, the complex machine is connected to a computer network, and executes an image processing (image-forming processes) while transmitting and receiving data to and from various devices, such as a personal computer, a server or another image-processing apparatus.

Some of the complex machines can request another device to execute a predetermined functionality by way of the network, and utilize the results of the execution. In this case, the corresponding other device is referred to as a function expansion server. Upon receipt of a request from the complex machine, the function expansion server executes a predetermined data processing operation, and transmits the results thereof to a predetermined device. Here, the predetermined device, that is, the output destination, may be the complex machine that has outputted the request, or may be still another function expansion server or the like.

In cooperation with the function expansion server, the complex machine is allowed to implement a data-processing system suitable for business contents (work flow) of the user so that the workload of the user can be reduced and, for example, image-processing operations can be carried out by using the latest image-processing algorithm that is not installed in the complex machine main body.

To develop a user environment in which the complex machine having high performance and multiple functions can be fully utilized efficiently, elemental technologies relating to a user interface are very essential technologies. In fact, researches and developments have been vigorously carried out so as to improve the usability of the user interface.

However, in recent years, technical renovations has been accelerated and the degree of cooperation of the complex machine with an external device is increased. Hence, concerns have been focused, in addition to the technique for improving the usability of the user interface, also onto a technique for easily updating the structure of the user interface. In recent years, concerns are also focused onto a technique for customizing the structure of the user interface so as to meet the user's demands and for easily altering the structure of the user interface in association with functional updates of the complex machine and an external device such as a function expansion server.

In general, the complex machine is provided with a display (preferably, a touch panel display) as standard outputting means, as well as software keys and hardware-keys as standard inputting means, both of which serves as a user interface. Here, the software keys are a group of keys displayed on a touch panel display, and the user is allowed to carry out key operations by touching predetermined regions on the touch panel display. On the touch panel display, software keys to which predetermined functions are assigned are displayed with various shapes, and are deleted when they are no longer required. In contrast, the hardware-keys are a group of keys that are disposed on the complex machine as physical entities, and the user is allowed to depress the hardware-keys, each having a button shape, so that key operations are carried out. In general, a hardware-key is considered to be superior to a software key in visibility and operability. However, different from the software keys, the hardware-keys are not easily changed in their shapes and cannot be eliminated. Yet, it is possible to assign various functions to the hardware-keys variably according to the state of the complex machine. For example, a complex machine has a start key as one of the hardware-keys. The start key is particularly high in its frequency of use among the keys of the complex machine, and is usually prepared as a large-size key that is superior in visibility and operability. Consequently, various functions, such as a start of scanning execution, a start of copying execution and a start of execution for facsimile transmission, are dynamically assigned to the start key depending on the current mode of the complex machine. In addition, a complex machine may also include numeric keys, a stop key and the like as ones of the hardware-keys.

Hereinafter, an example of a prior art related to a user interface of a complex machine (image-processing apparatus) will be described.

JP 2006-127503 A discloses an image-processing system. The image-processing system is provided with an image-processing apparatus and a remote computing device, and the image-processing apparatus and the remote computing device are connected to each other so as to transmit and receive data to and from each other. The image-processing apparatus of JP 2006-127503 A has a mode (hereinafter, referred to as "first mode") in which operations are carried out by itself, and another mode (hereinafter, referred to as "second mode") in which a power for controlling the apparatus is assigned to the remote computing device and the user interface of the apparatus is used to exchange information between the user and the remote computing device. In the second mode of above, the user interface of the image-processing apparatus operates substantially under the control of the remote computing device. In the second mode, the image-processing apparatus operates such that the data relating to a menu screen to be displayed on the user interface are acquired from the remote computing device and the menu screen is structured and displayed on the display unit based on the data. When the user carries out an input, such as information, an instruction or the like, onto the menu screen, the image-processing apparatus transmits to the remote computing device the data relating to the input so that the remote computing device executes a predetermined process and returns the results of the process to the image-processing apparatus. The image-processing apparatus receives the results, and carries out operations according to the results so that the corresponding operations in response to the user input are executed.

In this manner, in the image-processing system disclosed in JP 2006-127503 A, the data to be used for structuring the menu screen (user interface) of the image-processing apparatus are managed by the remote computing device, and the remote computing device transmits data on demand according to the state of the image-processing apparatus. Therefore, the image-processing apparatus is not necessarily provided with the data used for structuring the menu screen, and the menu screen of the image-processing apparatus can be updated only by updating the data managed by the remote computing device. Moreover, JP 2006-127503 A indicates that data described in a mark-up language (HTML, XML, WML, XHTML data or the like) can be used as the data for structuring the menu screen. In other words, JP 2006-127503 A discloses a technique used for structuring a web-based user interface (menu screen).

In general, the image-processing apparatus, such as the complex machine, is provided with hardware-keys as the user interface, and JP 2006-127503 A discloses only a technique (for example, see Table 2 of JP 2006-127503 A) for switching functions assigned to each of the hardware-keys of the image-processing apparatus in response to the first mode and/or the second mode. Thus, the technique relating to controls of the hardware-keys of JP 2006-127503 A, concerns a method for switching functions of the hardware-key between the first mode and the second mode, and JP 2006-127503 A does not disclose a technique in which the controls to the hardware-keys are dynamically switched according to a state in the modes.

Not only the disclosure of JP 2006-127503 A, the user interface, which may be structured from the information which a browser function module (for example, web browser) acquires information from a server (for example, web server) on demand, has already been known as a web-based user interface.

By adopting the framework of the web-based user interface as the user interface, while using a touch panel display as the display device (display unit), a display screen (display unit) formed on the touch panel display and software keys (input unit) embedded in the display screen can be integrally realized by the browser function module.

For this reason, when the user interface of a complex machine structured as the web-based user interface, functions used for major operations and for inputting information are assigned to the software keys, and the hardware-keys are hardly utilized.

However, the touch panel display has to display various pieces of information as the user interface display unit. For this reason, the area within the display surface to be utilized for displaying the software keys is inevitably limited, and to provide a large number of software keys on the touch panel display, while taking into consideration sufficient visibility and operability thereof, is actually almost impossible.

In addition, the operational feeling which a user receives while operating the software keys displayed on the touch panel display is relatively faint in comparison with the feeling which the user receives while operating the hardware-keys. As a result, it makes the user to recognize whether his/her operation given to the software key is actually inputted into the complex machine or not. Consequently, the user often makes an operational mistake, such as an erroneous input and an overlapped input, when operating the software keys. This problem is not ignorable from the viewpoint of usability of the user interface.

SUMMARY OF THE INVENTION

In view of the above-mentioned problems, it is an object of the present invention to provide an image-processing apparatus having a user interface, such as a web-based user interface, structured based upon page data provided from an external server or from a server module inside the image-processing apparatus, and in particular to provide an image-processing apparatus which can dynamically control the functions assigned to hardware-keys of the user interface in response to the contents of a screen displayed on the display unit of the user interface.

According to one aspect of the present invention, there is provided an image-processing apparatus. The image-processing apparatus includes: a communication interface unit; a user interface display unit which is arranged to provide information to a user; a user interface input unit provided with a hardware-key which is arranged to receive an input from the user; a web browser which is arranged to acquire page data from a web server, structure a display screen based upon the page data, and display the display screen on the user interface display unit; a hardware-key function assignor which is arranged to determine a function to be assigned to the hardware-key based upon the page data; and a hardware-key control unit which is arranged to control the hardware-key in accordance with the determination of the hardware-key function assignment by the hardware-key function assignor.

According to another aspect of the present invention, there is provided a server device. The server device includes: a communication interface unit; a web server unit which is arranged to transmit page data to a web browser in response to a request from the web browser; an application server unit which is arranged to return text data to the web server unit based upon the request received through the web server unit; and a data server unit which is arranged to retain a data base for storing data relating to an image-processing apparatus in which the web browser is installed, wherein the application server unit inquires, based upon the request, of the data server unit for a hardware-key mounted on the image-processing apparatus and a function to be assigned to the hardware-key, and generates the text data containing a first keyword that specifies the hardware-key and a second keyword that defines the function to be assigned to the hardware-key based upon the response to the inquiry, and wherein the web server unit transmits to the web browser the page data containing the text data.

According to a further aspect of the present invention, there is provided a computer-readable medium having stored thereon computer executable instructions. The computer executable instructions, when executed by a computer of an image-processing apparatus, performs: causing a web browser to acquire page data from a web server, structure a display screen based upon the page data, and display the display screen on a user interface display unit; causing a hardware-key function assignor to determine a function to be assigned to a hardware-key based upon the page data; and causing a hardware-key control unit to control the hardware-key in accordance with the determination of the hardware-key function assignment by the hardware-key function assignor.

According to a yet further aspect of the present invention, there is provided a computer-readable medium having stored thereon computer executable instructions. The computer executable instructions, when executed by a computer of a server device, perform: causing a web server unit to receive a request from a web browser; causing an application server unit to inquire, based upon the request received through the web server unit, of a data server unit for a hardware-key mounted on a image-processing apparatus in which the web browser is installed and a function to be assigned to the hardware-key, the data server unit retaining a data base for storing data relating to the image-processing apparatus; causing the application server unit to generate text data containing a first keyword that specifies the hardware-key and a second keyword that defines the function to be assigned to the hardware-key based upon the response to the inquiry, and to return the text data to the web server unit; and causing the web server unit to transmit to the web browser page data containing the text data in response to the request.

BRIEF DESCRIPTION OF THE DRAWINGS

The above and further objects and novel features of the present invention will more fully appear from the following detailed description when the same is read in connection with the accompanying drawings, and in which:

FIG. 9 is a flow chart of processes carried out in the server 101;

FIG. 10 illustrates a look-up table for referencing an assigning table based upon a URL;

FIG. 11 illustrates an example of the assigning table;

FIG. 12 illustrates another example of the assigning table;

FIG. 14 illustrates another example of HTML data;

FIG. 15 illustrates an example of XHTML data;

FIG. 16 illustrates another example of XHTML data;

FIG. 17 illustrates an example of a correspondence table between a keyword that specifies a hardware-key and the corresponding key;

FIG. 18 illustrates an example of a correspondence table between a keyword that regulates a function to be executed and the corresponding function;

FIG. 19 illustrates another example of a correspondence table between a keyword that regulates a function to be executed and the corresponding function;

FIG. 20 illustrates an example of a description format for keywords;

FIG. 21 illustrates another example of a description format for keywords;

Figure 1:
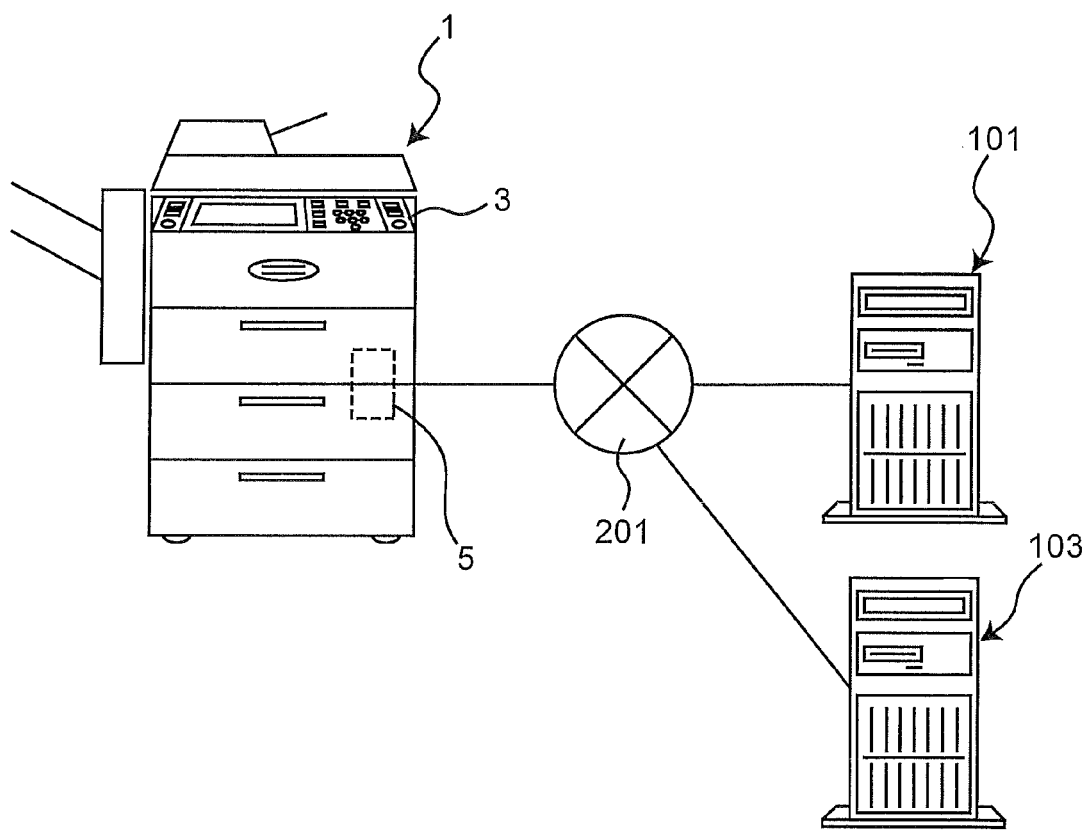
FIG. 1 is a schematic diagram of an image processing system according to an embodiment of the present invention.

It is to be expressly understood, however, that the drawings are for the purpose of illustration only and are not intended as definitions of the limits of the invention. Preferred embodiments of the present invention are described in more detail below referring to these accompanying drawings.

DETAILED DESCRIPTION OF THE PREFERRED EMBODIMENTS

The embodiment of the present invention provides an image-processing apparatus having a user interface that is configured based upon page data supplied from an external server or a server module inside the image-processing apparatus. In the embodiment of the present invention, functions are dynamically assigned to the hardware-keys included in the user interface of the image-processing apparatus in response to the contents of a screen displayed on the display unit of the user interface. With this arrangement, the embodiment of the present invention makes it possible to provide the user with an image-processing apparatus operation environment capable of utilizing hardware-keys more effectively in comparison with the conventional art.

By providing an operation environment of the image-processing apparatus in which hardware-keys that are superior to software keys in visibility and operability can be utilized more effectively in comparison with the conventional art, the embodiment of the present invention makes it possible to provide an image-processing apparatus having a user interface with usability superior to that of the conventional art.

An image-processing apparatus according to an embodiment of the present invention will be described with reference to the attached drawings. In the present embodiment, the image-processing apparatus is a digital complex machine (hereinafter, referred to as "complex machine"). However, the image-processing apparatus of the present embodiment is not limited to the complex machine, but also includes various types of image-processing apparatuses, such as a copying machine, a printer, a scanner and a facsimile apparatus.

The complex machine according to the present embodiment is provided with a web browser function, and, based upon page data acquired from an external web server or an internal web server module (also referred to as "Web Page Data" including, for example, text data described in a markup language such as HTML, XHTML, XML or the like, and binary data such as image data referenced from the text data), the web browser forms at least a part of a display unit and an input unit (software key) of a user interface, and can also dynamically assign a function to a hardware-key that forms another part of the input unit in response to an update of the display unit. The assigning of a function to the hardware-key can be executed based upon at least one of a uniform resource identifier (URI) relating to the page data and text information described in the page data in a predetermined format. When determining a function to be assigned to a hardware-key based upon the URI for page data, the complex machine of the present embodiment determines the function to be assigned to the hardware-key by reference to information that indicates a relationship between the URI such as a URL and a function assigning to the hardware-key. Alternatively or additionally, the complex machine of the present embodiment analyzes the contents of the page data, and can control the function assignment to the hardware-key based upon the contents of the page data. In this case, a server device according to the present embodiment describes in a predetermined format the function to be assigned to the hardware-key in the text data, such as HTML data, XHTML data, etc. of the page data which is used for structuring the display unit and the software keys of the complex machine and supplies these to the complex machine. The server device according to the present embodiment may insert the information relating to the function to be assigned to the hardware-key into the text data such as HTML data, for example, as a comment element, such that the display unit and the software key are not affected. With this arrangement, it is possible to control the hardware-key without giving any effects to the contents displayed on a screen for a user and requiring any additional data. Moreover, the complex machine may acquire text data, such as HTML data, supplied by a general web server, detect a tag description in the text data, and control the function assignment to the hardware-key based upon the detected tag. The complex machine may assign a function to a hardware-key based upon the text data, such as HTML data, which is supplied from a general web server that does not have any technical feature inherent to the present embodiment dynamically in response to an update of the screen display. In this manner, the complex machine is capable of simultaneously updating the function assigned to the hardware-key every time it acquires new page data without the necessity of acquiring any additional data. With this configurations, the function of the hardware-key can be dynamically altered in response to the contents of the screen displayed on the display unit of the user interface, without any increase in an amount of data to be transmitted to and from a server or the like. In the present embodiment, URL (Uniform Resource Locator) of page date is used as URI. The user is allowed to use a hardware-key of which function is appropriately altered in response to a change in the displayed contents on the display unit. Therefore, it is expected that occasions would be increased in which operations are carried out by means of hardware-keys in stead of using software keys in the circumstances in which the complex machine is conventionally operated by means of software keys. In general, hardware-keys are superior to software keys in visibility and operability. Consequently, the complex machine according to the present embodiment makes it possible to reduce misoperations of keys by the user. In this manner, the present embodiment improves usability of the user interface of the image-processing apparatus provided with a web-based user interface. The server or the like that supplies the page data to the image-processing apparatus (complex machine) according to the present embodiment may be a web server that is configured by only the general technologies; however, more preferably, a server device provided with technical features inherent to the present embodiment is used. The image-processing apparatus of the present embodiment and the server device of the present embodiment constitute an image-processing system according to the present embodiment.

The complex machine according to the present embodiment retains internally the contents of functions to be assigned to hardware-keys based on the description of text data (HTML date, XHTML data or the like) contained in page data, and updates contents of the assigned functions in conjunction with an update of the screen based upon new page data acquired in association with the update of the displayed contents of the display unit of the user interface. In the case where a depressed hardware-key is recognized, the present complex machine can determine contents of a process to be executed in response to the key depression without the necessity of any inquiring process to the external web server. This is also advantageous from the viewpoint of the amount of data to be communicated with the server or the like.

A touch panel display may be used as a device forming a display unit of the user interface. In this case, the software keys forming at least a part of the input unit of the user interface are configured on the touch panel display.

The server device, which supplies page data in response to a request from the web browser of the complex machine is not necessarily prepared as a server device that is placed outside the complex machine and connected to the complex machine through a network. In the present embodiment, the complex machine can implement a web server function therein using a piece of software (server module) that is executed by the computer of the complex machine. In this case, the data transmitting and receiving processes are carried out between the web browser and the server module inside the complex machine so that, based upon the page data acquired by the web browser from the server module, the display unit and software keys of the user interface are configured and functions are assigned to the hardware-keys. In this case, the complex machine can constitute the image-processing system according to the present embodiment solely.

Moreover, the complex machine of the present embodiment may have a function for monitoring the internal state of the machine itself. Furthermore, a plurality of functions and conditions for reference to select a function ("referenced conditions") may be given to a single hardware-key so that, when function is assigned to the single hardware-key, one of the functions can be alternatively selected from the functions based upon information obtained through the monitoring process.

In the complex machine of the present embodiment, the hardware-keys include, for example, a start key that receives a job-executing instruction or the like, numeric keys used for inputting numerical characters and the like to the complex machine and a stop key used for ceasing an operation being currently executed, and are not limited thereto.

(Configuration of Image-Processing System)

FIG. 1 is a schematic diagram of an image-processing system 301 according to the present embodiment. The image-processing system 301 includes a complex machine 1 (MFP), a server 101 and a network 201 that connects the MFP 1 and the server 101. The MFP 1 includes a user interface 3 forming a contact point with a user, and a communication interface unit 5 as a device forming a contact point with the network 201. The server 101 is a server device according to the present embodiment. In the network 201, a web server 103 that has no technical features of the present embodiment may be connected. Hereinafter, the server according to the present embodiment represented by the server 101 is referred to as an "dedicated server," while a generally-used web server represented by the server 103 is referred to as a "non-dedicated server."

Figure 2:
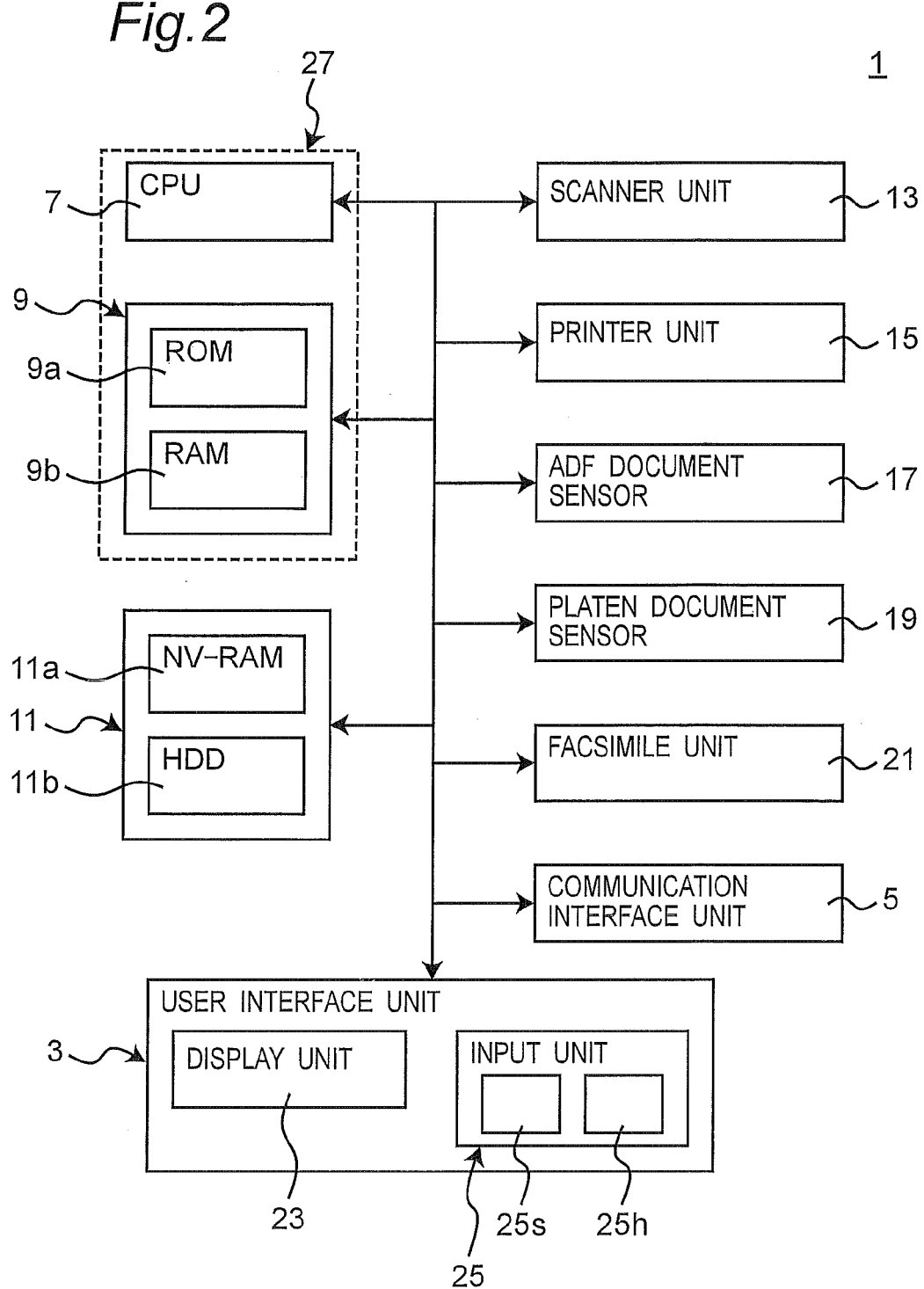
FIG. 2 is a block diagram of a hardware configuration of a complex machine 1.

FIG. 2 is a block diagram of a hardware configuration of the MFP 1. The MFP 1 is provided with a central processing unit (CPU) 7, a read only memory (ROM) 9*a*, a random access memory (RAM) 9*b*, a non-volatile memory (NV-RAM) 11*a* and a hard disk drive (HDD) 11*b*. The CPU 7, ROM 9*a* and RAM 9*b* constitute a computer main unit 27 of the complex machine, and the ROM 9*a* and RAM 9*b* constitute a main storage unit 9 of the computer main unit 27. Moreover, the NV-RAM 11*a* and the HDD 11*b* constitute an auxiliary storage unit 11. The computer main unit 27 of the MFP 1, which executes a program according to the present embodiment retained on the main storage unit 9 or the auxiliary storage unit 11, realizes an image-processing apparatus according to the present embodiment. It is to be noted that the program may be stored in a portable storage medium such as a flexible disk or the like and distributed on a medium basis, or may be provided through an electric communication line such as the Internet. The MFP 1 is provided with: a scanner unit 13 which photo-electrically reads image information recorded on a printing medium, such as paper, mounted on an automatic document feeder (ADF)) (not shown) which automatically feeds original document sheets one by one or a document platen (document glass) (not shown) so as to generate electronic data of the read image information; a printer unit 15 which forms the image information on the print medium, such as paper, based upon the electronic data representing the image information; an ADF document sensor 17 which detects the presence or absence of a document sheet on the ADF; a platen document sensor 19 which detects the presence or absence of a document sheet mounted on the document platen; a facsimile unit 21 which transmits a facsimile document based upon electronic data representing image information and receives a transmitted facsimile document from the outside to generate electronic data representing image information; and a communication interface unit 5 which performs transmission and reception of data via the network 201 (FIG. 1) or the like. In addition, the MFP 1 is provided with a user interface unit 3 which forms a contact point of information output/input with a user. The user interface 3 is provided with a display unit 23 serving as standard output means, which is used for providing information to a user and an input unit 25 serving as standard input means, which is used for receiving information from a user; and the input unit 25 is configured with a software key unit 25s and a hardware-key unit 25h. As is generally known, the software key unit 25s may be formed integrally with the display unit 23 using a touch panel display.

(Hardware Configuration of Server 101)

Figure 3:
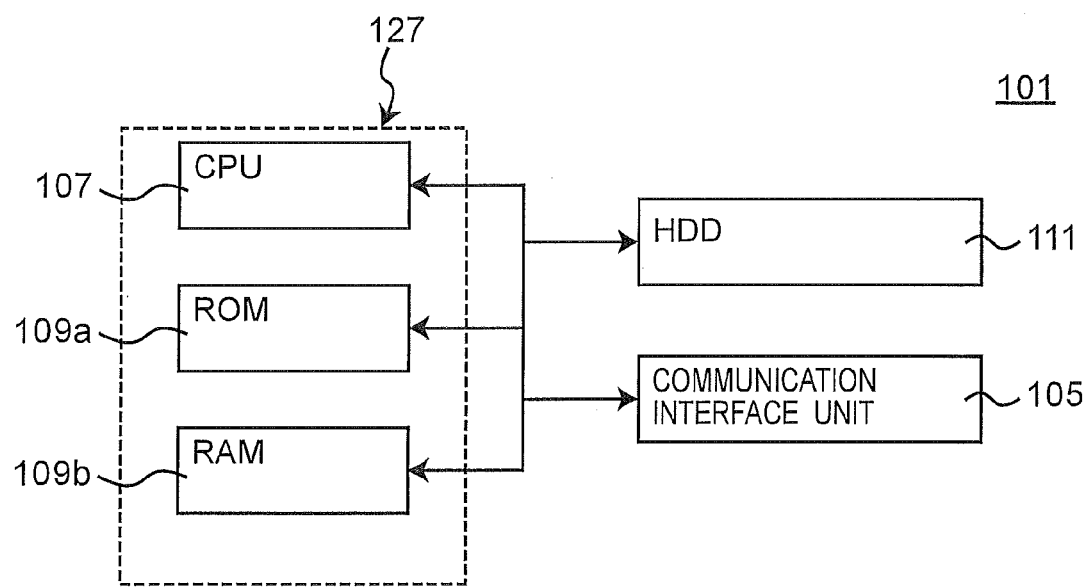
FIG. 3 is a block diagram of a hardware configuration of a server 101.

FIG. 3 is a block diagram of a hardware configuration of the server 101 according to the present embodiment. The server 101 is provided with a central processing unit (CPU) 107, a read only memory (ROM) 109a, a random access memory (RAM) 109b, and a hard disk drive (HDD) 111. The CPU 107, ROM 109a, and RAM 109b constitute a server computer main unit 127, and the ROM 109a and RAM 109b constitute a main storage unit of the computer main unit 127. Moreover, the HDD 111 forms an auxiliary storage unit of the computer main unit 127. The computer main unit 127 of the server 101 realizes a server according to the present embodiment by executing a program according to the present embodiment that is retained in the main storage unit or the auxiliary storage unit. The above program may also be stored in a portable storage medium such as a flexible disk or the like and distributed on a medium basis, or may be provided through an electric communication line such as the Internet. The server 101 is provided with a communication interface 105 which transmits and receives data to and from the network 201 (FIG. 1) or the like.

(Functional Configuration of MFP 1)

Figure 4:
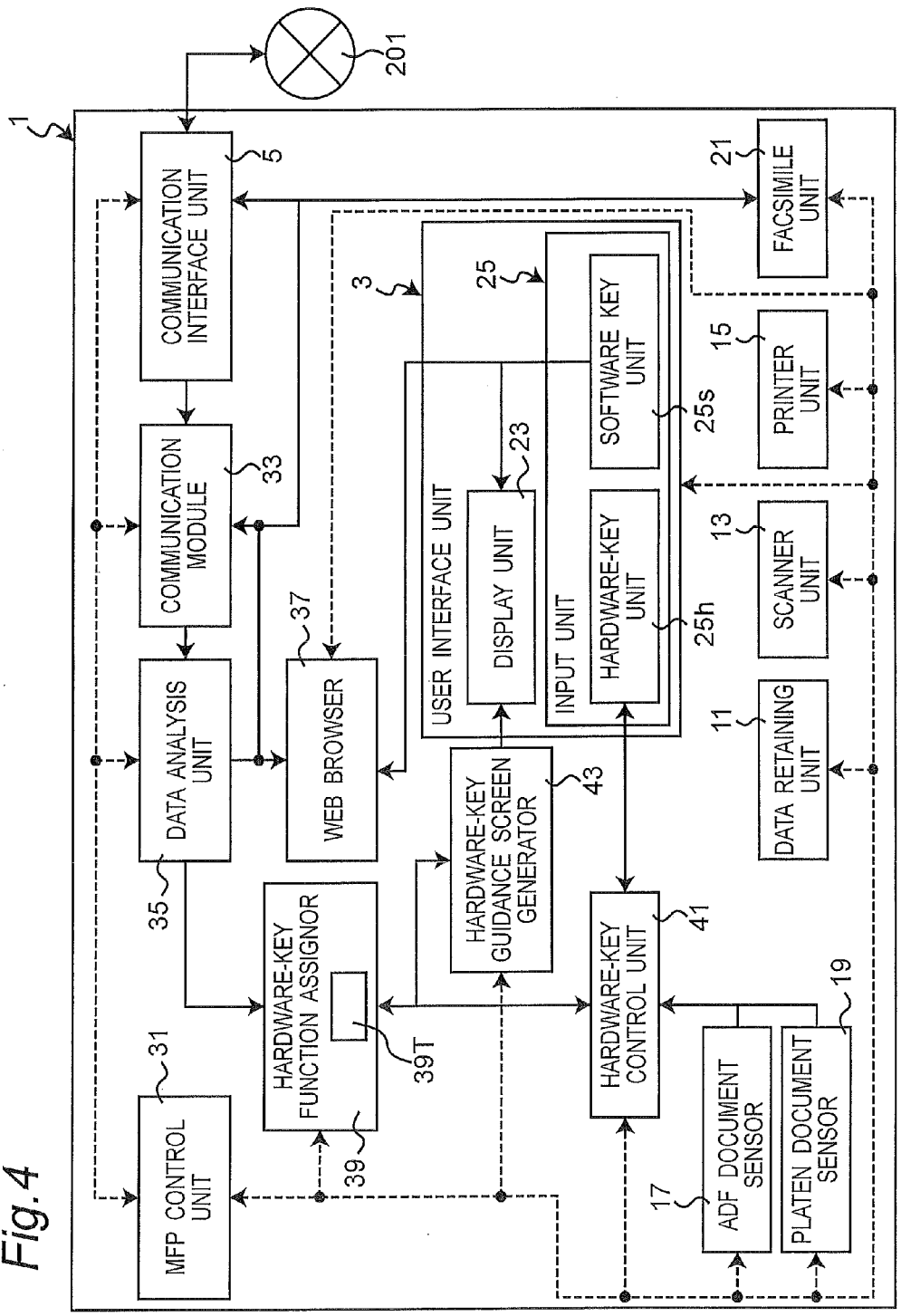
FIG. 4 is a block diagram of a functional configuration of the complex machine 1.

FIG. 4 is a block diagram of a functional configuration of the MFP 1. The functional blocks shown in FIG. 4 include a functional block and hardware elements that are implemented when the computer main unit 27 (FIG. 2) executes the program according to the present embodiment. In FIG. 4, hardware elements that are the same as those of FIG. 2 are denoted with the same reference numerals in FIG. 2.

The MFP 1 is provided with an MFP control unit 31. The MFP control unit 31 controls the entire operations of the MFP 1. For example, when receiving a notification of a depression of the hardware-key unit 25h from the hardware-key control unit 41 (which is also referred to as HK control unit), the MFP control unit 31 sends, if necessary, instructions to blocks related to the execution of the function assigned by a hardware-key function assignor 39 (which is also referred to as a function assignor), according to the contents of the function.

A data retaining unit 11 is a storage device used for retaining image data and the like. The data retaining unit 11 executes storing and reading operations of data under the control of the MFP control unit 31.

Here, a communication interface unit 5 is a physical device (hardware) for establishing a data communication connection between the MFP 1 and the network 201. The communication interface unit 5 is implemented using a network card, for example. The MFP 1 transmits and receives data to and from the server 101 via the communication interface unit 5 and the network 201.

A communication module 33 is a communication module (software) which is implemented when the computer main unit 27 (FIG. 2) executes a predetermined program. The communication module 33 performs data transmission and reception operations to and from the communication interface unit 5 etc. For example, data transmitted from the server 101 through the network 201 are once received by the communication module 33 via the communication interface unit 5, and then transferred to modules constituting a data analysis unit 35 and a web browser 37. At the same time, data to be transmitted from the web browser 37 to the server 101 are also once received by the communication module 33, and then sent to the communication interface unit 5.

The data analysis unit 35 has a function for notifying the function assignor 39 of a URL of page data supplied from the server 101. In addition, the data analysis unit 35 has: a function for analyzing the description in text data, such as HTML data and XHTML data, in the page data supplied from the server 101 so as to extract from the text data hardware-key control information which specifies a hardware-key and prescribes a function to be assigned to the specified key, and transmitting the information to the function assignor 39; and a function for transmitting the supplied page data to the web browser 37.

The web browser 37 transmits a request message in compliance with, for example, the hyper text transfer protocol (HTTP) to the server 101, and receives page data (a response message to the request message) sent from the data analysis unit 37, and structures a display screen of the display unit 23 of the user interface unit 3 and a software key unit 25s based upon the acquired page data. The web browser 37 can also transmit to the server 101 additional information relating to the MFP 1. The additional information relating to the MFP 1 includes, for example, a machine ID of the MFP 1, a model name of the MFP 1 and a user ID of the user currently being logged on. The additional information may be included in the environmental information of the HTTP request message and transmitted. Moreover, the web browser 37 can execute an application described in JavaScript (registered trademark) etc. to request the server 101 to provide an XML document etc. in which the hardware-key control information is described. In this case, the web browser 37 can acquire the hardware-key control information at an arbitrary timing being independent from the acquisition of the page data for updating the structure of the display unit 23 and software-key unit 25s. This approach may be implemented in a manner similar to what we call Ajax.

The function assignor 39 determines a hardware-key function assigning table 39T (which is also referred to as assigning table) based upon at least one of the URL of the page data and the hardware-key control information extracted from the page data. The table 39T includes information indicating a relationship between each key of the hardware-key unit 25h and a function(s) to be assigned to the key and can be referenced by the HK control unit 41 and a hardware-key guidance screen generator 43 (which is also referred to as a guidance generator). In order to determine the assigning table 39T based upon the URL of the page data, the function assignor 39 is provided with a table showing relationships between a URL and a table which indicates relationships between hardware-keys and functions assigned thereto (look-up table for referencing an assigning table based upon a URL), and executes the function assigning operation to the hardware-keys based upon the URL by referring to this look-up table.

The HK control unit 41 controls, in particular, the hardware-key unit 25h of the user interface unit 3. Referring to the assigning table 39T retained by the function assignor 39, the HK control unit 41 controls the functions to be assigned respectively to the hardware-keys 25h, and, if necessary, also controls on/off, colors etc. of the LEDs of the hardware-key unit 25h. Moreover, the HK control unit 41 can also recognize a depressed state of any one of the keys of the hardware-key unit 25h and, when the depressed state is recognized, notifies the MFP control unit 31 of such depressed state. When notifying the depressed state, the HK control unit 41 may also inform the MFP control unit 31 of the function assigned to the depressed hardware-key by referring to the assigning table 39T. Furthermore, the HK control unit 41 may be designed so that, if the unit 41 recognizes that the function of the depressed hardware-key is disabled through the reference to the assigning table 39T, the HK control unit 41 refrains from notifying the MFP control unit 31 of the depressed state. Alternatively, the HK control unit 41 may be designed to only notify the MFP control unit 31 of the depressed state, and, when the MFP control unit 31 receives the notification, the MFP control unit 31 may recognize the function assigned to the hardware-key related to the notification thorough the reference to the assigning table 39T of the function assignor 39.

The guidance generator 43 generates a guidance display related to the functions assigned to the respective keys of the hardware-key unit 25h onto the display unit of the user interface unit 3 so that the guidance display is given on a predetermined field of the display unit 23 (status display region (not shown) located on the lowermost row)), or a pop-up window or the like being displayed onto a normal display screen of the display unit 23 in an overlapped manner; thus, it improves the usability for the user. Upon generating the guidance display, the guidance generator 43 refers to the assigning table 39T of the function assignor 39. The MFP 1 may be designed so that a function for executing the pop-up display or the like of the guidance is preliminarily assigned to a "help" key or an "enlarged display" key (FIG. 7); thus, the user is allowed to view the corresponding guidance at his or her desired timing. Moreover, the MFP 1 may be configured so that an administrator and/or a user can preliminarily set the execution and/or non-execution of the guidance display. Furthermore, prior to the execution of the guidance display, the guidance generator 43 may display a screen which confirms the user as to whether or not the dynamic function assigning operation to the hardware-keys according to the present embodiment should be executed. In this case, only in the case where the user inputs the will of agreement, the HK control unit 41 executes the dynamic function assigning process on the hardware-keys based upon the page data acquired from the server 101. Alternatively or additionally, only in the case where the user gives the agreement for the dynamic function assigning process to the hardware-keys at the guidance display, the HK control unit 41 may execute the dynamic function assigning process to the hardware-keys based upon the assigning table 39T. In other words, the HK control unit 41 may control the hardware-keys so that the hardware-key function assigning process based upon the table 39T should not be executed when no guidance display is given by the guidance generator 43 and/or when no agreement is given by the user on the guidance display by the guidance generator 43, and so that the hardware-key function assigning process based upon the table 39T should be immediately executed upon the receipt of the agreement. With the above-mentioned guidance display function, it is possible to prevent misoperations even for the user who is not familiar with the change of the function due to the dynamic hardware-key assigning function in accordance with the display contents of the display unit according to the present embodiment.

(Functional Configuration of Server 101)

Figure 5:
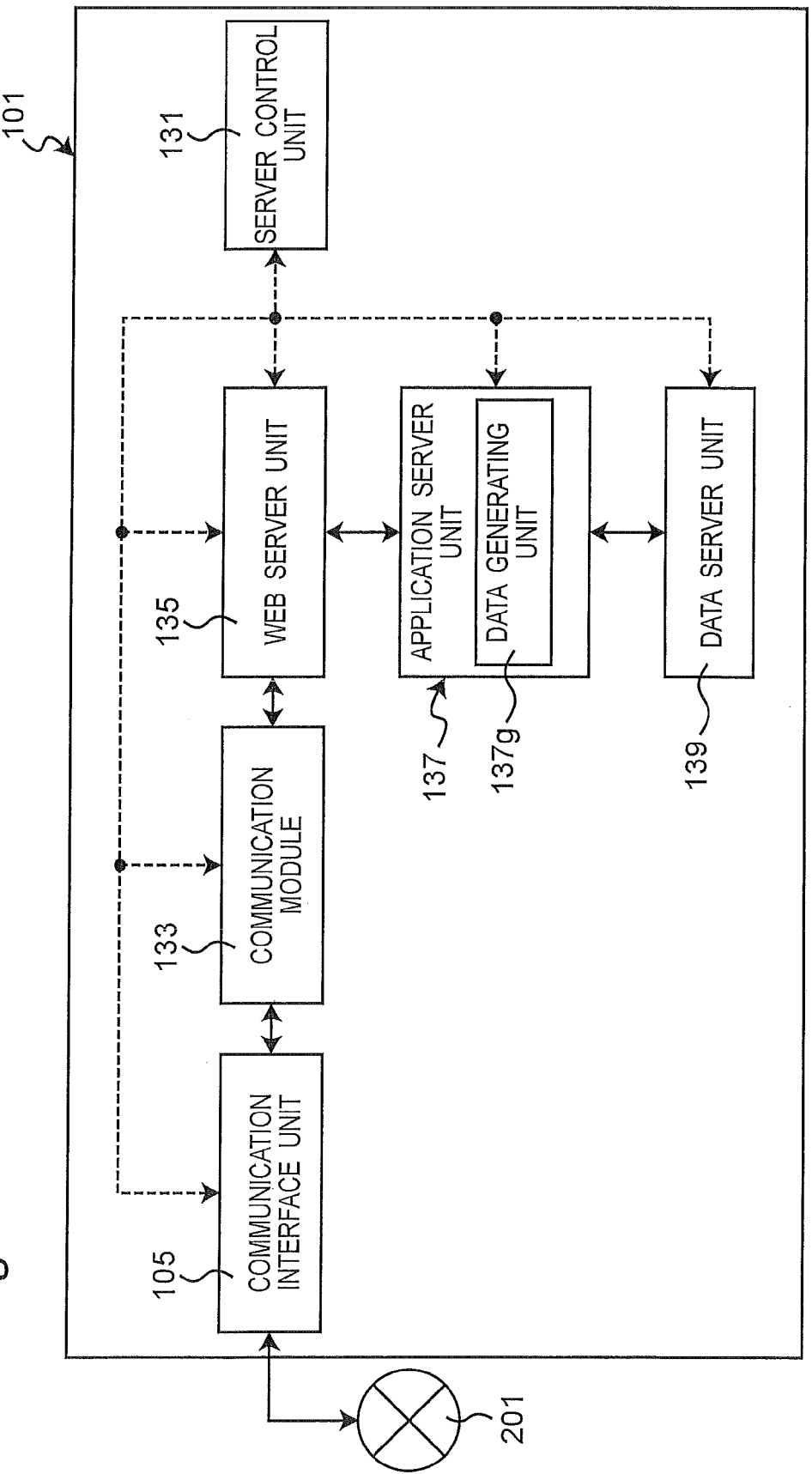
FIG. 5 is a block diagram of a functional configuration of the server 101.

FIG. 5 is a block diagram of a functional configuration of the server 101. The functional blocks shown in FIG. 5 include functions and hardware elements that are implemented when the computer main unit 127 (FIG. 3) executes the program according to the present embodiment. In FIG. 5, the same hardware elements as those shown in FIG. 3 are denoted by the same reference numerals as those in FIG. 3.

The server 101 is provided with a server control unit 131. The server control unit 131 controls the entire operations of the server 101. For example, the server control unit 131 controls the communication interface unit 105 and a communication module 133 so as to perform communication with the complex machine 1, and also manages operation of each server modules of a web server unit 135, an application server unit 137, and a data server unit 139 systematically.

The communication module 133 is a communication module (software) which is implemented when the computer main unit 127 (FIG. 3) executes a predetermined program. The communication module 133 performs data transmission and reception operations to and from the communication interface unit 105 etc. For example, data for an HTTP request, which have been transmitted from the complex machine 1 through the network 201, are once received by the communication module 133 via the communication interface unit 105, and then transferred to a module(s) constituting the web server unit 135. At the same time, data for a response message in compliance with HTTP, which have been generated by the web server unit 135 are also once received by the communication module 133, and then delivered to the communication interface unit 105.

The web server unit 135 has a function that, when a request message transmitted from the web browser 37 of the complex machine 1 received, the web server unit 135 returns page data to the web browser 37 as a response message for the request. Moreover, based upon the request message, the web server unit 135 requests the application server unit 137 to carry out processes for generating HTML data and/or XHTML data (HTML data etc.). The web server unit 135 forms page data using the HTML data etc. generated by the application server unit 137, and transmits the page data to the web browser 37 of the complex machine 1 as a response message.

When the application server unit 137 receives the request for generating HTML data etc. from the web server unit 135, a data generating unit 137g of the application server unit 137 executes processes for generating the HTML data. Based upon the additional information relating to the MFP 1, which is contained in the request message, the data generating unit 137g carries out a data inquiry operation, in which data relating to the complex machine 1 are required to the data server unit 139. Then, based upon the response from the data server unit 139, the data generating unit 137g determines: whether function-assigning operations for the hardware-key unit 25h of the complex machine 1 should be carried out or not; and functions to be assigned to respective keys of the hardware-keys, and generates HTML data or XHTML data with a keyword(s) for specifying the hardware-key(s) and a keyword(s) for defining a function(s) to be assigned to the corresponding key(s) contained therein, so that the generated data are transferred to the web server unit 135. It is to be noted that the application server unit 137 may determine which format between the data formats of HTML and XHTML should be used for generating the data according to the additional information relating to the MFP 1.

The data server unit 139 is provided with a data base function for storing information relating to the functions equipped within the image-processing apparatus, programs installed therein, the configurations of the hardware-keys, configurations of the display unit 23 and the like on a model-type basis of the image-processing apparatus or on a machine ID basis of the image-processing apparatus. The data server unit 139 can also update information stored therein on demand, based upon information inputted from the input unit 25 of the MFP 1 and/or data relating to the state of the MFP 1.

By the cooperative operations of the server functions of three kinds, when an HTTP request message is received from the MFP 1, the application server unit 137 refers to the information relating to the MFP 1 retained by the data server unit 139 based upon the additional information relating to the MFP 1 in the request message so as to determine the function which is to be assigned to the key of the hardware-key unit 25h of the MFP 1 and generate HTML or XHTML data by describing the contents of the determination in a predetermined format. Then, the web server unit 135 sends the data as page data to the MFP 1.

(MFP Variation Example)

Figure 6:
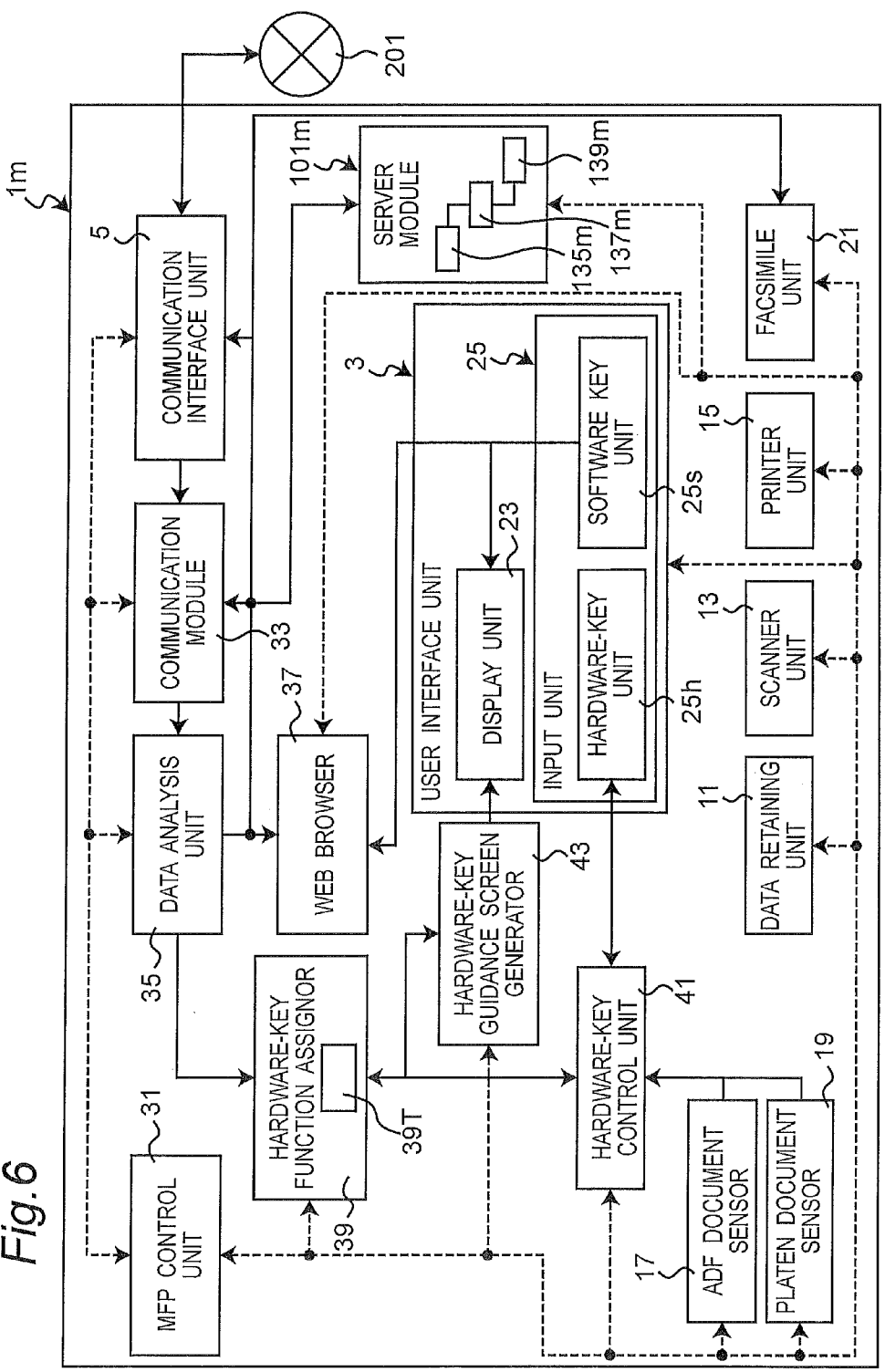
FIG. 6 is a block diagram of a functional configuration of a complex machine variation example 1m.

The MFP 1 may include the functions of the server 101 therein. FIG. 6 is a block diagram of an MFP variation example 1m, which is provided with the server functions. The MFP 1m includes a server module 101m having the functions equivalent to those of the web server unit 135, the application server unit 137, and the data server unit 139 of the server 101 as modules 135m, 137m and 139m.

(Flow of Processes)

Next, a flow of processes in the MFP 1 and the server 101 will be described. The processes in the flow chart referred are realized as the CPU 7 of the MFP 1 and/or the CPU 107 of the server 101 execute(s) a program(s) stored in the respective main storage unit or auxiliary storage unit.

Figure 7:
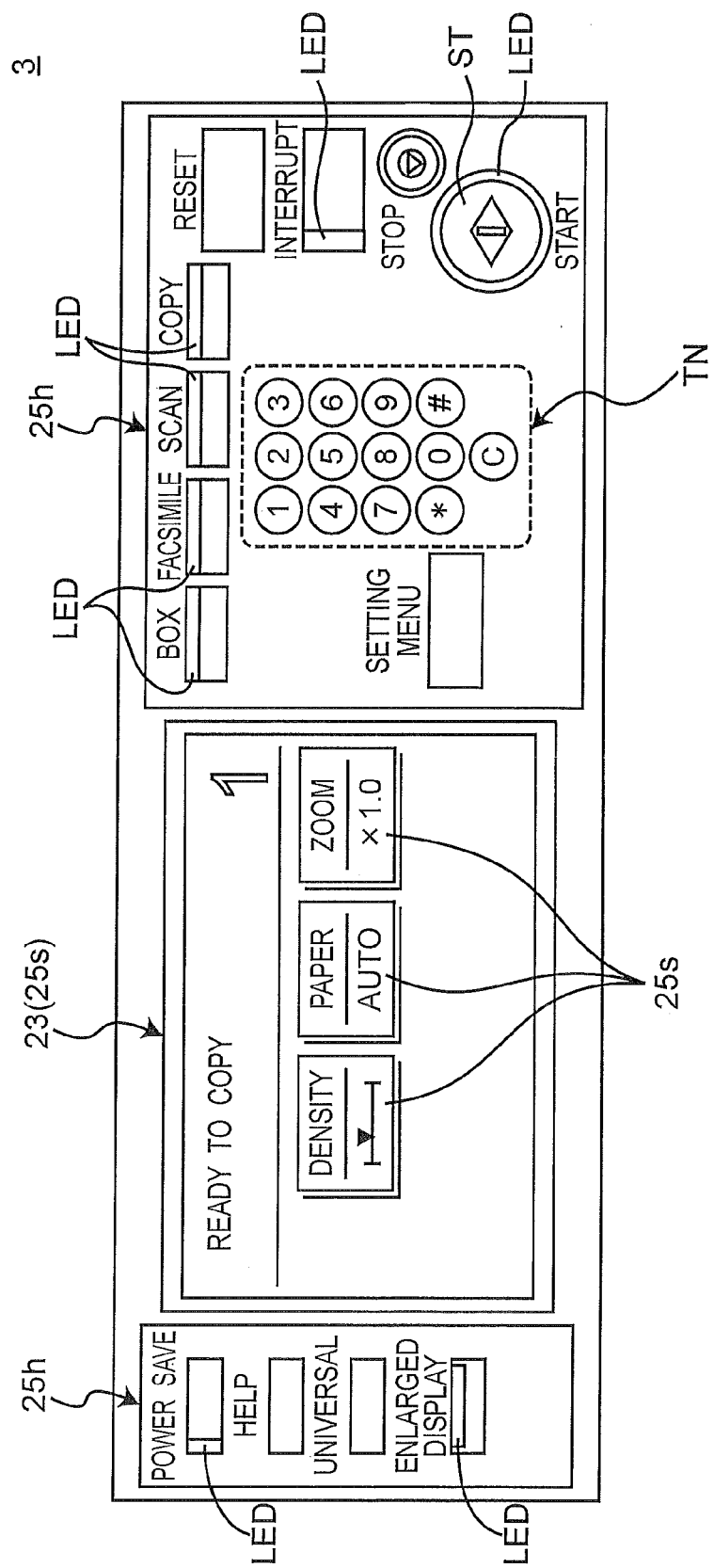
FIG. 7 is a schematic diagram of a user interface unit 3.

FIG. 7 is a schematic diagram showing the user interface unit 3 in detail. As already described, the user interface unit 3 includes the display unit 23, the software key unit 25s and the hardware-key unit 25h.

First, the display unit 23 is described briefly. The display unit 23 may be a touch panel display. In the complex machine according to the present embodiment, the contents of a screen on the display unit 23 are structured from screen data generated by the web browser 37 based upon the acquired page data, as will be described below.

The contents of the screen on the display unit 23 include the software key unit 25s. The software key unit 25s is also structured from the page data acquired from the server 101 by the web browser 37. When the software-key unit 25s displayed on the display unit 23 is depressed, the web browser 37 recognizes the state of such depression, and sends, based upon the function assigned to the depressed key of the software key unit 25s, predetermined information to the server 101 (request transmission). The server 101 then executes predetermined processes and returns the updated web page data to the MFP 1 (response reception). As receiving the updated page data from the server 101, the web browser 37 updates the contents of the display unit 23 based upon the data. Further, the web browser 37 may cause the MFP 1 to execute predetermined operations based upon the data received from the server 101. In short, the behaviour regarding the displaying operation of the display unit 23 including the display of the software key unit 25s and other operations in the complex machine at when the software-key unit 25s is depressed can be determined by the server 101 based upon the data transmitted from the web browser 37 of the complex machine 1, and the complex machine 1 carries out operations by receiving from the server 101 data relating to the determination.

On the other hand, the hardware-key unit 25h is prepared as buttons provided both sides of the touch panel display 23. On the left side of the touch panel display 23, a Power Save key for switching to/from a power save mode, a Help key for displaying a help screen, a Universal key for switching to/from a universal displaying, and an Enlarged Display key for switching to/from an enlarged displaying are provided. Some keys are equipped with LEDs depending on characteristics of the functions assigned to those keys. The LEDs is capable of lighting one or more colors so as to indicate the ON/OFF state of the function assigned to the corresponding key, and/or to indicate the valid/invalid state of the depressed key. On the right side of the touch panel display 23, mode keys such as Box, Facsimile, Scan and Copy, used for switching job modes, numeric keys TN used for inputting settings such as the number of copies, Setting Menu keys used for making transition to a mode in which set items in the complex machine 1 can be edited, a Reset key, an Interrupt key used for enabling a job interruption, a Stop key, and a Start key ST are arranged. The mode keys are provided with LEDs so as to indicate to a user the current mode of the complex machine 1. The Interrupt key is also provided with an LED so as to indicate to a user the ON/OFF state of the interruption and also whether or not an interruption is currently enabled with the color of the lighted LED or a change in the lighting modes. A user can recognize whether or not the Start key is able to be depressed (whether the depression operation is effective/ineffective) through the color of the lighted LED or a change in the lighting mode. The complex machine 1 according to the present embodiment can change the colors and/or modes of lighting of those LEDs based upon the page data received from the server 101.

Figure 8:
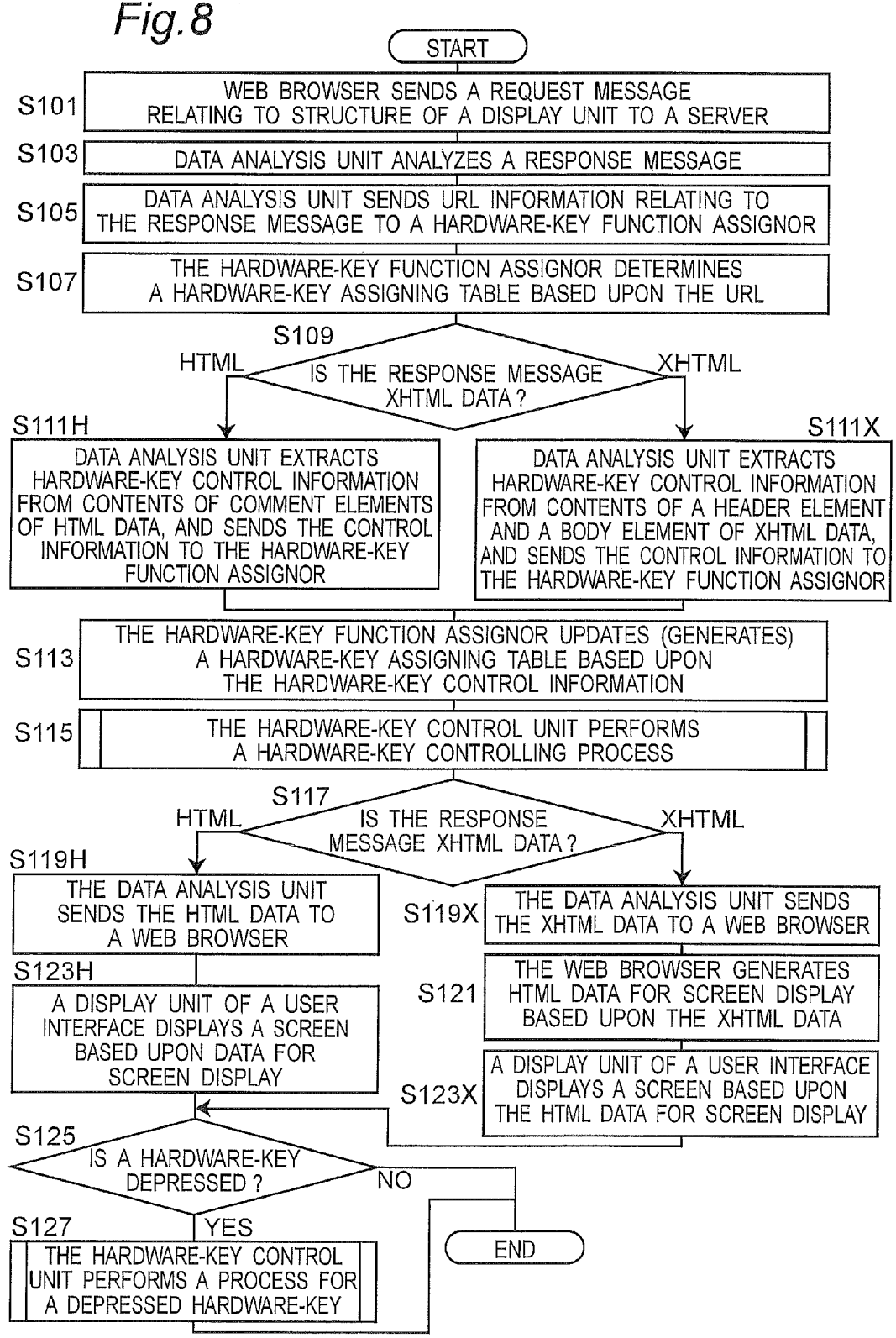
FIG. 8 is a flow chart of processes carried out in the MFP 1.

FIG. 8 is a flow chart of processes which the MFP carries out. The MFP 1 executes the processes for structuring the display unit 23 and the software key unit 25s and for assigning functions to the hardware-key unit 25 based upon the page data acquired from the server 101 along the flow of this chart. The MFP 1 also has an operation mode in which the MFP 1 carries out operations solely without the communications with the server 101. Since the present embodiment relates to the dynamic assignments of the hardware-key functions based upon the data acquired from the server 101, the description of the above-mentioned single operation mode will not be given.

In step S101, the web browser 37 of the MFP 1 sends to the server 101 a request message for acquiring data required for structuring the display unit 23 (and the software key unit 25s). The server 101 returns to the MFP 1 a response message (page data etc.) in response to step S101.

FIG. 9 is a flow chart of processes which the server 101 carries out from the time at which the web server unit 135 (FIG. 5) of the server 101 (FIG. 5) receives the request message from the MFP 1 to the time at which the web server unit 135 transmits the response message for the corresponding request.

In step S201 of FIG. 9, the data generating unit 137g (FIG. 5) of the application server unit 137 carries out a data inquiry operation, in which the setting data of the MFP 1 are required to the data server unit 139, according to the additional information relating to the MFP 1 contained in the request message delivered from the web server unit 135.

In step S203 of FIG. 9, the data server unit 139 supplies setting data of the MFP 1 to the application server unit 137.

The setting data of the MFP 1 may include information relating to the functions to be assigned to the respective keys of the hardware-key unit 25h of the MFP 1, and may also include information relating to conditions that are referred to for determining a function to be executed in case where a plurality of functions are assigned to a single hardware-key, or the like.

In step S205 of FIG. 9, the data generating unit 137g of the application server unit 137 determines the functions to be assigned to the respective keys of the hardware-key unit 25h of the MFP 1 based upon the MFP 1 setting data.

In step S207 of FIG. 9, the data generating unit 137g of the application server unit 137 generates HTML data or XHTML data in which information as to the assignment to the respective keys of the hardware-key unit 25h of the MFP 1 is described in a predetermined format, and supplies the generated data to the web server unit. Regarding the predetermined format, it will be described later in detail with reference to an example. Briefly speaking, when generating HTML data, a keyword(s) that specifies a hardware-key(s) to which a function(s) is assigned and a keyword(s) that specifies a function(s) to be assigned to the hardware-key(s) are described in the HTML data as a comment element. The comment element may preferably be described in a header portion of the HTML data. On the other hand, when generating XHTML data, a keyword(s) that specifies a hardware-key(s) to which a function(s) is assigned and a keyword(s) that specifies a function(s) to be assigned to the hardware-key(s) are described in a field surrounded by a predetermined tag(s) in the XHTML data.

In step S209 of FIG. 9, the web server 135 generates page data with the HTML data or XHTML data received from the data generating unit 137g of the application server unit 137 included to form a response message having the page data, and transmits the generated data to the MFP 1 as an HTTP response message.

Referring to FIG. 8 again, processes after the receipt of the response message by the web browser 37 of the MFP 1 will be discussed.

In step S103, the data analysis unit 35 analyzes the response message. In this step, the data analysis unit determines which of the HTML data or XHTML data the response message contains, and obtains the URL of the HTML or XHTML data. It is to be noted that the step S103 may be executed based upon the data contained in the request message sent from the web browser 37 in step S101. That is, the data analysis unit 35 may obtain the URL or the like by analyzing the request message.

In step S105, the data analysis unit 35 sends the URL information obtained in step S103 to the function assignor 39.

In step S107, the function assignor 39 assigns functions to the hardware-keys based upon the URL information received from the data analysis unit 35. More specifically, the function assignor 39 determines whether a corresponding record exists or not by searching for the corresponding record with the use of the received URL information as a retrieval key within a look-up table for referencing an assigning table based upon a URL (which is also referred to as look-up table), which is preliminarily retained. If exists, the function assignor 39 adopts a table described in the hardware-key function assigning table field of the corresponding record as a assigning table 39T. Then, the HK control unit 41, the guidance generator 43, the MFP control unit 31, and the like perform the function assigning processes to the hardware-key unit 25h according to the contents of description of the assigning table 39T.

FIG. 10 is an example of the look-up table. The function assignor 39 searches for the URL which coincides with the received URL information within the look-up table. If the URL is found, the function assignor 39 adopts the table recorded with being associated with the URL as the assigning table 39T. On the other hand, when no URL is found, the function assignor 39 does not have to determine a table to be adopted as the assigning table 39T in this step.

FIG. 11 is an example of the assigning table 39T. The assigning table example 1 retains the relationship between a plurality of hardware-keys as function assigning targets and functions to be assigned to the respective keys.

For example, in the assigning table example 1, a function for scrolling the displayed screen of the display unit 23 (FIG. 7 etc.) upward is assigned to "2" of the numeric keys TN (FIG. 7). Similarly, a function for starting an execution of a copy job is assigned to the Start key ST (FIG. 7).

FIG. 12 is another example of the assigning table 39T. An assigning table example 2 also retains the relationship between a plurality of hardware-keys as function assigning targets and functions assigned to the respective keys. However, in the assigning table example 2, a plurality of functions can be assigned to a single hardware-key, and a referenced condition(s) intended to be used for determining which one of the functions is executed is retained with being associated with the single hardware-key and the functions thereof. For example, in this assigning table example 2, "disabled" (no function to be executed) and inputting a character of "A column (Japanese syllabary)" are assigned to "1" of the numeric keys TN (FIG. 7). As the referenced condition for selecting the function "disabled" or the function "inputting a character of "A column (Japanese syllabary)," "mounted document exists" and "no mounted document exists" are defined. That is, if the "1" of the numeric keys TN is depressed, the MFP 1 checks the state of the machine itself to judge the contents described in the referenced condition and selects from the table 39T a function to be actually executed and, then, executes the selected function. As regards the referenced condition "(no) mounted document exists" of the assigning table example 2, the MFP 1 judges whether any document is mounted or not according to the outputs from the Adf document sensor 17 (FIG. 4) and the platen document sensor 19 (FIG. 4).

Referring to FIG. 8 again, in step S109, the data analysis unit 35 determines whether XHTML data or HTML data have been received as the response message. When the data analysis unit 35 determines that the XHTML data have been received as the response message ("XHTML" in step S109), the processes proceed to S111X. the data analysis unit 35 determines that the HTML data have been received as the response message ("HTML" in step S109), the processes proceed to S111H.

In step S111H, the data analysis unit 35 retrieves a comment element within the HTML data, extracts a keyword or the like relating to the function assignments to the hardware-keys (hardware-key control information) from the comment element, and sends the extracted information to the function assignor 39.

Figure 13:
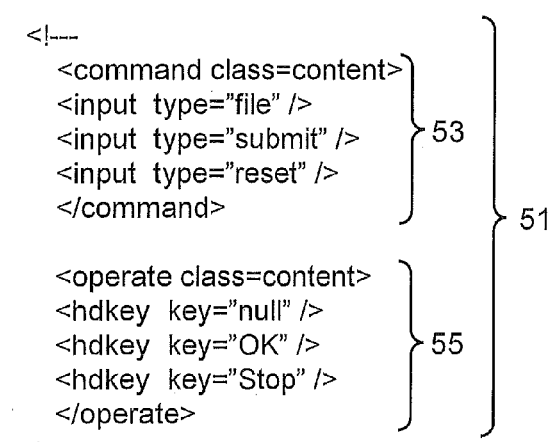
FIG. 13 illustrates an example of HTML data.

FIG. 13 is a diagram of a description example of the HTML data in the response message acquired by the MFP 1 from the server 101. In the HTML data, a keyword 55 which specifies a hardware-key to which a function is assigned and a keyword 53 that defines the function to be assigned to the hardware-key are described as comment elements 51 in the header portion. For example, a function "reset" is defined as input type="reset" using a keyword "reset" (the fourth line of the element 53), and "Stop Key" (FIG. 7) that is the hardware-key to which the function should be assigned is specified as hdkey key="Stop" (the fourth line inside element 55). In the case where a plurality of keywords including keywords relating to functions and keywords relating to hardware-keys to which the functions are assigned are described, they may be described as that the order of the functions coincides with the order of the keys to each of which the function is assigned.

FIG. 14 is a diagram of another description example of the HTML data. In this example, it is described as that the keywords relating to hardware-keys and the keywords relating to functions to be assigned may form a table structure 57. For example, in the third line of the table structure 57, the hardware-key "Stop Key" (FIG. 7) to which a function should be assigned is specified as hdkey key="Stop" using the keyword "Stop," and the corresponding function "reset" is defined as attribute="input" type="reset" using the keyword "reset."

Referring to FIG. 8 again, in step S111X, the data analysis unit 35 retrieves a predetermined tagged element from the XHTML data, extracts a keyword or the like relating to the function assignments to the hardware-keys (hardware-key control information) from a region surrounded by the tags, and sends the extracted information to the function assignor 39.

FIG. 15 is a diagram of a description example of the XHTML data contained in the response message acquired by the MFP 1 from the server 101. In the XHTML data, a keyword 53x which specifies a hardware-key to which a function is assigned is described in a region surrounded by tags "command," and a keyword 55x which defines a function to be assigned to the hardware-key is described in a region surrounded by tags "operate." Also in this example, a function "reset" is defined as input type="reset" using the keyword "reset" (the fourth line inside element 53x), and "Stop Key" (FIG. 7) that is the hardware-key to which the function should be assigned is defined as hdkey key "Stop" using the keyword "Stop" (the fourth line of element 55x), for example. As regards the ordering of the keywords in the respective elements 53x and 55x, the same manner as that of the description example of HTML data in FIG. 13 may be used.

FIG. 16 is a diagram of another description example of the XHTML data. In this example, it is described as that the keywords relating to hardware-keys and the keywords relating to functions to be assigned may form a table structure 57x. For example, in the third line of the table structure 57x, the hardware-key "Stop Key" (FIG. 7) to which a function should be assigned is specified as hdkey key="Stop" using the keyword "Stop," and the corresponding function "reset" is defined as attribute="input" type="reset" using the keyword "reset."

In this manner, in the present embodiment, information relating to a hardware-key and a function to be assigned to the key can be described in the XHTML data by using predetermined keywords, that is, using a predetermined tagged element and its attribute and attribute value. Moreover, in the present embodiment, even when forming HTML data, information relating to a hardware-key and a function to be assigned to the key can be described in a format in compliance with XML format within a comment element.

Referring to FIG. 8 again, in step S113, the function assignor 39 updates the assigning table 39T based upon the received hardware-key control information. In the case where the assigning table 39T is not determined in step S107, the assigning table 39T may newly be generated according to the hardware-key control information in this step. The updated or newly generated assigning table 39T may have a similar structure to those described with reference to FIGS. 11 and 12. That is, it is only necessary for the assigning table 39T to retain the relationship between a hardware-key and a function to be assigned to the key. However, in the case where a plurality of functions is assigned to a single key, an item relating to the condition which should be referenced for selecting one function from the functions is added to the table 39T.

FIG. 17 shows an example of a relationship between a keyword for specifying a hardware-key described in the HTML data or XHTML data and a hardware-key specified by that. Preferably, the relationship is preliminarily retained in the MFP 1. Otherwise, the MFP 1 may separately acquire the information relating to the relationship from an external device (the server 101, for example).

FIG. 17 shows keywords described in the form of attribute values (see FIG. 15 etc.) of the "type" attribute of the tagged element "hdkey" within the element region surrounded by the tags "operate." As clearly seen in FIG. 17, the keyword "1" represents the "1" key of the numeric keys TN (FIG. 7).

FIG. 18 shows an example of a relationship between a keyword for specifying a function to be assigned to a hardware-key described in the HTML or XHTML data and a function specified by that. Preferably, the relationship is also preliminarily retained in the MFP 1. Otherwise, the MFP 1 may separately acquire the information relating to the relationship from an external device (server 101, for example).

FIG. 18 shows keywords described in the form of attribute values (see also FIG. 15 etc.) of the "type" attribute of the tagged element "input" within the element region surrounded by the tags "command." For example, the keyword "upscroll" represents a function for scrolling the displayed screen of the display unit 23 upward.

FIG. 19 shows another example of a keyword defining a function assigned to a hardware-key. Also in this example, the keyword can be described in the form of an attribute value of the "type" attribute of the tagged element "input" in the element region surrounded by the tags "command."

For example, an attribute value "input||submit" defines a function for firstly executing a scanning function to generate image data and then transmitting the data as a transmitting object for the network transmitting function. In this manner, it is possible to describe processes in which an output of first function is used as an input to second function. Moreover, a plurality of functions may be connected to one another by means of logical operators (AND, OR etc.) so the processes in which second and/or third functions can be executed cooperatively or exclusively according to the result outputted by the first function can be described.

Furthermore, the example of FIG. 19 includes a column of "referenced condition." As described above, in the present embodiment, a plurality of functions can be assigned to a single hardware-key, and based upon a condition indicated by "referenced condition," one of the functions can be selected and executed in an alternative manner. For example, with respect to the attribute value "submit," a function "disabled (no function)" and a function "transmitting a file being selected" are assigned. One of those functions is selected from the two functions based upon a referenced condition "file to be transmitted is not selected yet (fole to be transmitted is selected)." In this case, when the hardware-key to which the functions are assigned is depressed, the MFP 1 checks whether a file is selected or not and compares the check result with the referenced conditions to determine a function to be executed and executes the function. In other examples, the attribute values "imgsrc1," "imgsrc2," and "imgsrc3" are keywords that define functions for selecting an image displayed on the display unit 23. The attribute value "imgsrc1" defines a function for selecting the first image of the images displayed on the display unit 23 (normally, one displayed in an upper right portion of a screen). In the same manner, the attribute values "imgsrc2" and "imgsrc3" define functions for selecting the second and third images of images displayed on the display unit 23.

FIG. 20 is a diagram illustrating format examples by which a keyword or the like may be described in HTML data or XHTML data. As shown in FIGS. 14 and 16, in the present embodiment, a keyword for specifying a hardware-key to which a function is assigned and a keyword for defining a function to be assigned to the key may be described as values of different attributes within one tagged element. This figure shows the example of such description format.

For example, referring to the first line of the example, it shows a description example for assigning to the "2" key of numeric keys TN (hdkey key="2") (FIG. 7) the function of "scroll upward" (type="upscroll"), which includes an operation to displayed screen contents (attribute="content").

FIG. 21 is a diagram of other format examples by which a keyword or the like may be described in HTML data or XHTML data.

For example, referring to the third line of the example, it shows a description example for assigning to the to Start Key ST (FIG. 7) (hdkey="Start") the function of "scan and upload" (type="input||submit"), which includes an information input operation (attribute="input").

Figure 22:
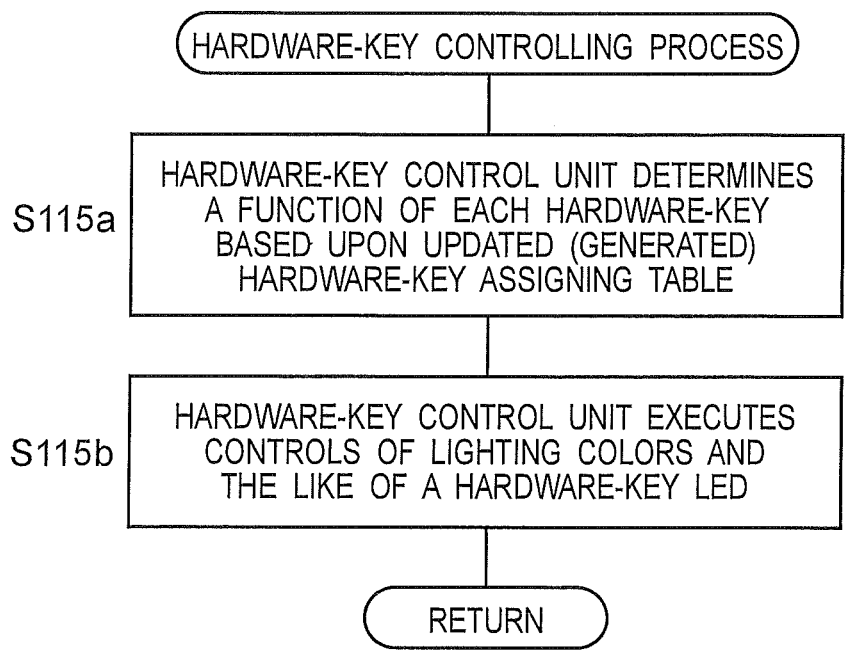
FIG. 22 is a flow chart of hardware-key controlling processes.

Referring to FIG. 8 again, in step S115, the HK control unit 41 executes hardware-key controlling processes. FIG. 22 is a detailed flow chart of step S115 (hardware-key controlling processes). In step S115a, the HK control unit 41 determines a function to be assigned to a hardware-key 25h with reference to the assigning table 39T updated (or generated) in step S113. In step S115b, the HK control unit 41, if necessary, checks the state of MFP 1 (as to whether or not a document is placed, whether or not any trouble occurs, whether or not sheets of paper are present, and the like), and executes controls on the hardware-key 25h, such as a control of the lighting color etc. of the LED (FIG. 7).

In step S117 of FIG. 8, a determination is made as to whether the page data contained in the response message is HTML data or XHTML data. In the case where the page data is HTML data ("HTML" in step S117), the processes proceed to step S119H. In the case where the page data is XHTML data ("XHTML" in step S117), the processes proceed to step S119X.

In step S119H, the data analysis unit 35 (FIG. 4) sends the HTML data to the web browser 37.

In step S119X, the data analysis unit 35 (FIG. 4) sends the XHTML data to the web browser 37.

In step S123H, the web browser 37 displays a screen on the display unit 23 based upon the received HTML data.

In step S121, the web browser 37 applies XSL (eXtensible Stylesheet Language) and a predetermined style sheet to the received XHTML data to generate HTML data for screen display.

In step S123X, the display unit 23 displays a screen based upon the HTML data for screen display.

In step S125, the HK control unit 41 determines whether or not the hardware-key 25h has been depressed. If the HK control unit 41 determines that the hardware-key 25h has been depressed ("YES" in step S125), the processes proceed to step S127. If the HK control unit 41 determines that the hardware-key 25h has not been depressed ("NO" in step S125), the processes are completed.

Figure 23:
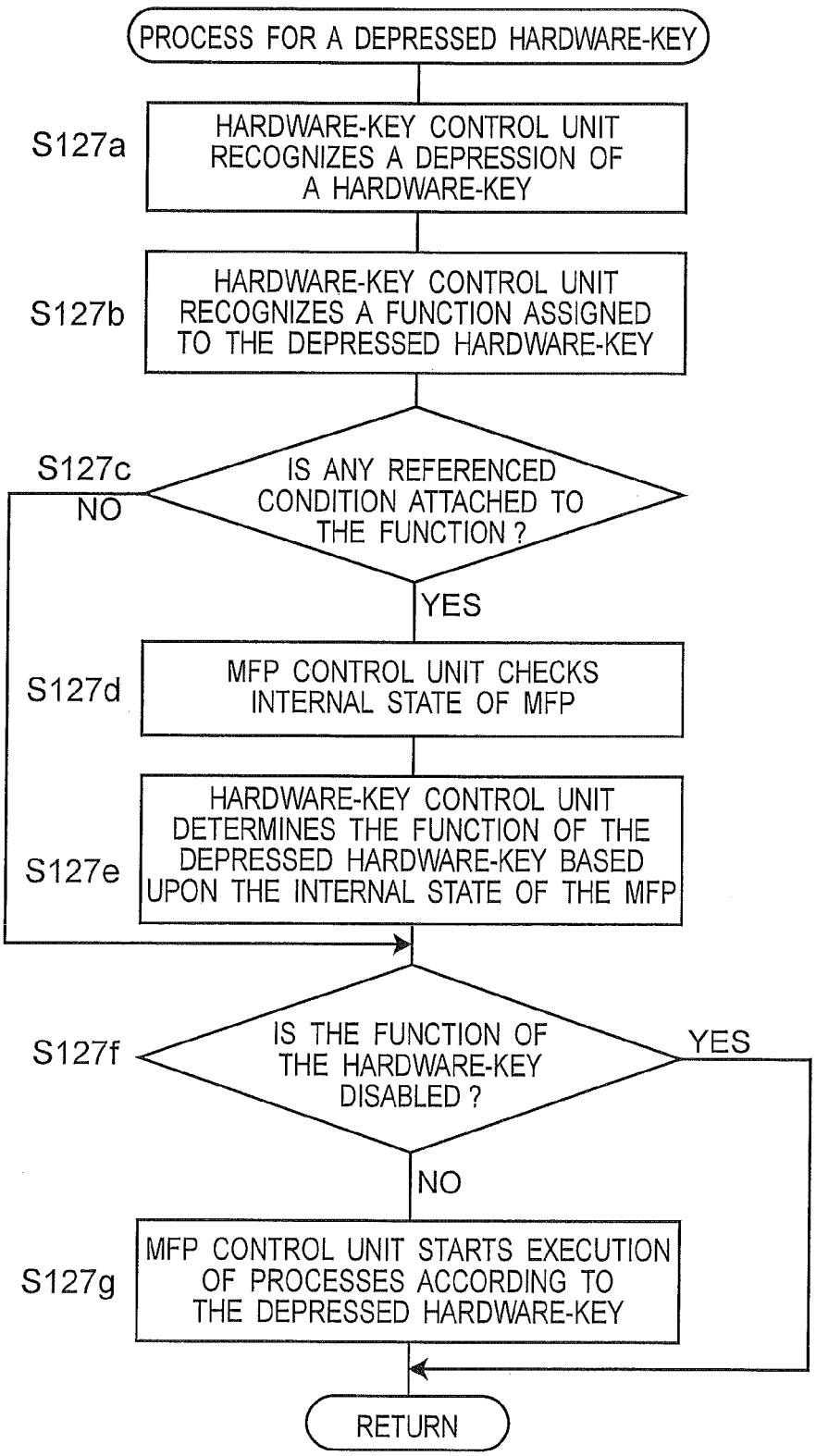
FIG. 23 is a flow chart of process for a depressed hardware-key.

FIG. 23 is a detailed flow chart of step S127 (process for a depressed hardware-key).

In step S127a, first, the HK control unit 41 recognizes a depression of the hardware-key 25h.

In step S127b, upon recognition of the depression of the key 25h, the HK control unit 41 recognizes the function assigned to the depressed key 25h based upon the assigning table 39T generated by the function assignor 39.

In step S127c, the HK control unit 41 determines whether or not a plurality of functions is assigned to the depressed key 25h together with a function selection condition (referenced condition). If the HK control unit 41 determines that a plurality of functions is assigned to the depressed key 25h together with a function selection condition (referenced condition) ("YES" in step S127c), the processes proceed to step S127d. If the HK control unit 41 determines that neither a plurality of functions nor a function selection condition (referenced condition) is assigned to the depressed key 25h ("NO" in step S127c), the processes skip to step S127f.

In step S127d, the MFP control unit 31 checks the internal state of the MFP 1 with respect to the terms relating to the referenced condition.

In step S127e, the HK control unit 41 determines the function of the depressed key 25h based upon the check result of step S127d.

In step S127f, the HK control unit 41 determines whether or not the function of the depressed key 25h is disabled based upon the recognition of step S127b and/or the determination of step S127e. If the HK control unit 41 determines that the function of the depressed key 25h is disabled ("YES" in step S127f), the processes of step S127 are completed. If the HK control unit 41 determines that the function of the depressed key 25h is not disabled ("NO" in step S127f), the MFP control unit 31 starts executing the function assigned to the depressed key 25h. It should be noted that, in the present embodiment, upon the execution of the function, the MFP 1 needs no information transaction with the server 101 for determining the contents of the function to be executed. That is, in the present embodiment, the MFP 1 needs no information retained by the server 101 during the processes from the recognition of the depression of the hardware-key 25h to the determination of the function to be executed. The image-processing apparatus with the web-based user interface according to the present embodiment is advantageous from the viewpoints of a response speed and a traffic load in the network.

As described above, the image-processing apparatus (MFP 1) of the present embodiment controls a function assigned to a hardware-key unit 25h of the input unit 25 of the user interface unit 3 based on page data (HTML data, XHTML data etc.) transmitted from the server 101 in the case where the user interface unit 3 is operated as a web-based user interface. For that purpose, the image-processing apparatus of the present embodiment requires no communication means other than the means for acquiring data for displaying the display unit 23 (page data) in order to control an operation to the hardware-key unit 25h. Moreover, the image-processing apparatus of the present embodiment can change a function assigned to the hardware-key unit 25h dynamically and cooperatively in response to an update of the display of the display unit 23. The hardware-key 25h are superior to the software keys 25s in visibility and operability. The image-processing apparatus according to the present embodiment is allowed to leverage the hardware-key 25h which is excellent in its visibility and operability so that its usability can be remarkably improved. Furthermore, the image-processing apparatus according to the present embodiment is provided with a guidance generator 43 (FIG. 4) as means for informing a user of the function of hardware-key that may be dynamically changed in response to the screen display so that the user can easily recognize the change. In the present embodiment, the functionality of the guidance generator 43 improves the usability further.

(Concerning the Cooperative Operations with Non-Dedicated Server)

In the above, it is described that the input unit 23 and the display unit 25 of the user interface 3 are structured through the cooperative operations with the server such as the server 101 that has the technical features according to the present embodiment (dedicated server). Below, a method in which the MFP 1 of the present embodiment changes the function of the hardware-key unit 25*h* dynamically in response to the update of the display of the display unit 23 based upon the page data (HTML data, XHTML data etc.) which has been acquired from the general web server 103 (FIG. 1) that is not provided with the technical features according to the present embodiment (non-dedicated server).

It should be understood that the page data (HTML data, XHTML data etc.) that is acquired from the non-dedicated server of course contain no keywords (tag, attribute's name and value, and the like), as shown in FIGS. 13 to 21. Hence, the MFP 1 extracts a tag from HTML (or XHTML) data (text data for screen display, described in a mark-up language) of the page data that has been acquired from the non-dedicated server, and assigns a predetermined function to a predetermined hardware-key based upon the extracted tag. Thereafter, in a period in which the screen is displayed based upon the HTML data, the MFP 1 can start executing the function assigned to the predetermined hardware-key if the key is depressed.

Figure 24:
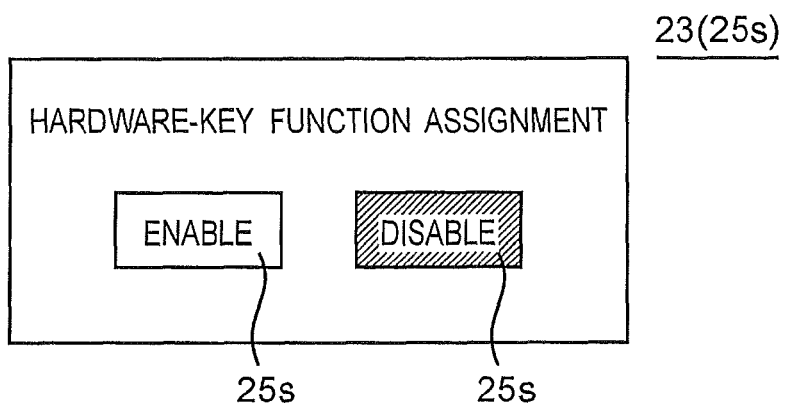
FIG. 24 illustrates an example of a screen at which an ON/Off of a hardware-key function assignment is selected.

The dynamic function assignment to the hardware-key based upon the page data acquired from the non-dedicated server can be switched between valid/invalid (enabled/disabled under user and/or administrator authorities. FIG. 24 is an example of a screen 23, at which the valid/invalid of the hardware-key function assignment based upon the page data acquired from the non-dedicated server can be selected. The user or the administrator can choose this selection screen in the setting mode of MFP 1 so as to select the valid/invalid.

Figure 25:
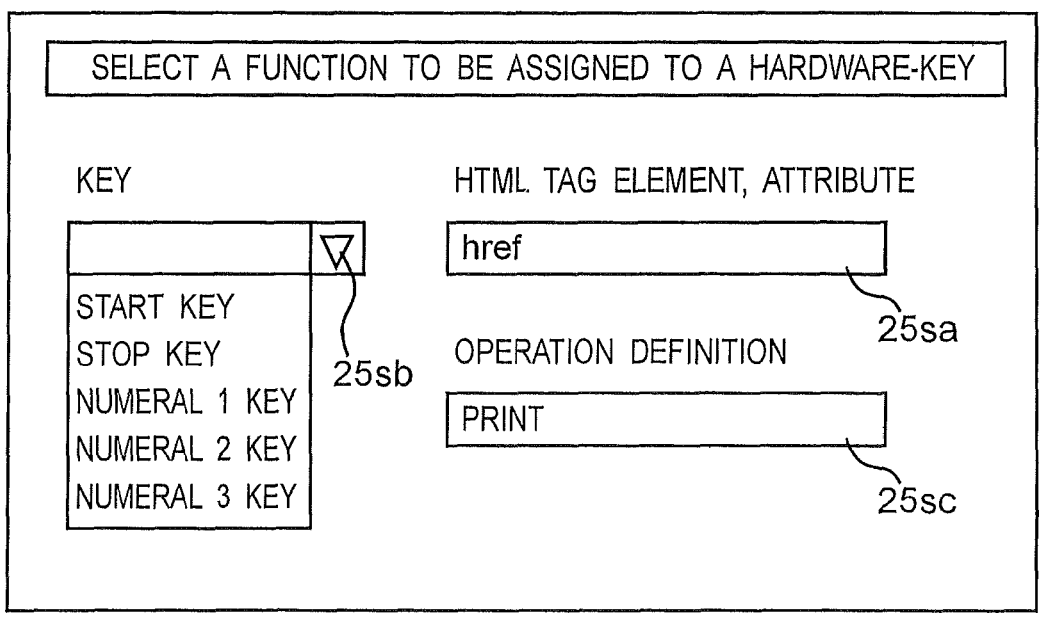
FIG. 25 illustrates an example of a screen at which, in the case of using a non-dedicated server, the hardware-key function assignment setting is set.

FIG. 25 illustrates a screen for setting the hardware-key function assignment according to a tag contained in HTML (XHTML) data in the page data acquired from the non-dedicated server.

The user or the administrator may input the name of a tag using a software key 25*sa*, select a hardware-key using a software key 25*sb*, to which a function is assigned according to the presence of the tag (tagged element) which inputted through the key 25*sa*, and define the function using a key 25*sc*, which is to be assigned to the key selected through the key 25*sb*.

In this manner, even in the case where the screen of the display unit 23 is structured using the page data acquired from the non-dedicated server, the MFP 1 of the present embodiment can dynamically change a function to be assigned to the hardware-key 25*h* in response to the displayed screen. It should be understood that, the user can also be informed of the function that is currently assigned to the hardware-key unit 25*h* by the working of the guidance generator 43 (FIG. 4).

In the present embodiment, web browser represents the functionality of acquiring a document described in a mark up language to structure a screen for display in accordance with the document. Such mark-up languages include HTML, XHTML, and the like but are not limited thereto.

The display unit 23 of the user interface unit 3 is not limited to a device that provides information to a user visually. The display unit 23 of the user interface unit 3 may be a device that provides information to the user using an audible output etc.

The input unit 25 of the user interface unit 3 is not limited to a device that allows a user to input information by touching the input unit. The input unit 25 of the user interface unit 3 may be a non-contact type information input device.

In the MFP 1 of the present embodiment, the start key ST (FIG. 7) may be assigned the function for instructing a start of a workflow processings employing a web service.

Moreover, in the MFP 1 of the present embodiment, a hardware-key may be assigned the function for sending a file to a predetermined destination (email, FTP or the like to a registered address). The MFP 1 is also suitable for use as an information terminal. For example, the MFP 1 as the information terminal can be used to deliver a POP (Point Of Purchase advertising) image from an office to each location of convenience stores or to deliver an image to a specific device, etc.

The present embodiment relates to an image-processing apparatus and a server device. The present embodiment is advantageous in that designing of its user interface and alteration to its design or the like can be easily carried out, for example.

As this invention may be embodied in several forms without departing from the spirit of essential characteristic thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image-processing apparatus comprising:
a communication interface unit;
a user interface display unit that is arranged to provide information to a user;
a user interface input unit provided with a hardware-key unit that is arranged to receive an input from the user;
a web browser that is arranged to acquire page data from a web server, structure a display screen based upon the page data, and display the display screen on said user interface display unit;
a hardware-key function assignor that is arranged to determine a function to be assigned to said hardware-key unit based only upon a URL of the page data; and
a hardware-key control unit that is arranged to control said hardware-key unit in accordance with the determination of the hardware-key function assignment by said hardware-key function assignor.

2. The image-processing apparatus according to claim 1, further comprising a guidance display generator that is arranged to generate a guidance display screen for explaining to the user the function assigned to said hardware-key unit as determined by said hardware-key function assignor and to display the guidance display screen on said user interface display unit.

3. The image-processing apparatus according to claim 1, wherein the page data includes text data described in a mark-up language,
the apparatus further comprising:
a data analysis unit that is arranged to analyze the text data to extract a first keyword that specifies said hardware-key unit being a target of the function assignment and a second keyword that defines a function to be assigned to the hardware-key unit so as to generate hardware-key control information,
wherein said hardware-key function assignor determines the function to be assigned to said hardware-key unit based upon the first keyword and the second keyword of the hardware-key control information.

4. The image-processing apparatus according to claim 3, wherein the text data is HTML data.

5. The image-processing apparatus according to claim 4, wherein the first keyword and the second keyword are described as a comment in a header portion of the HTML data.

6. The image-processing apparatus according to claim 3, wherein the text data is XHTML data.

7. The image-processing apparatus according to claim 6, wherein the first keyword is an attribute value of a predetermined tagged element and the second keyword is an attribute value of a predetermined tagged element.

8. An image-processing apparatus comprising:
a communication interface unit;
a user interface display unit that is arranged to provide information to a user;
a user interface input unit provided with a hardware-key unit that is arranged to receive an input from the user;
a web browser that is arranged to acquire page data from a web server, structure a display screen based upon the page data, and display the display screen on said user interface display unit;
a hardware-key function assignor that is arranged to determine a function to be assigned to said hardware-key unit based upon the page data;
a hardware-key control unit that is arranged to control said hardware-key unit in accordance with the determination of the hardware-key function assignment by said hardware-key function assignor;
a sensor that is arranged to detect a state of the apparatus itself;
a data analysis unit that is arranged to analyze the text data to extract a first keyword that specifies said hardware-key unit being a target of the function assignment and a second keyword that defines a function to be assigned to the hardware-key unit so as to generate hardware-key control information;
wherein the page data includes text data described in a mark-up language;
wherein said hardware-key function assignor determines the function to be assigned to said hardware-key unit based upon the first keyword and the second keyword of the hardware-key control information;
wherein the hardware-key control information includes a plurality of the second keywords that are associated with the single first keyword and information about a reference condition extracted from the text data; and
wherein said hardware-key control unit selects one of the plurality of functions defined by the second keywords based upon the reference condition and the state detected by said sensor and executes the selected function.

9. The image-processing apparatus according to claim 8, wherein said sensor includes a sensor being arranged to detect at least one of existence and nonexistence of a placed document.

10. A non-transitory computer-readable medium having stored thereon computer executable instructions which, when executed by a computer of an image-processing apparatus, perform:
causing a web browser to acquire page data from a web server, structure a display screen based upon the page data, and display the display screen on a user interface display unit;
causing a hardware-key function assignor to determine a function to be assigned to a hardware-key unit based only upon a URL of the page data; and
causing a hardware-key control unit to control the hardware-key unit in accordance with the determination of the hardware-key function assignment by the hardware-key function assignor.

11. An image-processing apparatus comprising:
a communication interface unit;
a user interface display unit that is arranged to provide information to a user;
a user interface input unit provided with a hardware-key that is arranged to receive an input from the user;
a web browser that is arranged to acquire page data from a web server, structure a display screen based upon the page data, and display the display screen on said user interface display unit;
a data analysis unit that is arranged to analyze text data included in said page data to extract a first keyword that specifies said hardware-key being a target of the function assignment, a plurality of second keywords that define functions to be assigned to each of said hardware-keys and a reference condition relating to a state of the apparatus itself intended to be used for determining which one of the functions is executed so as to generate hardware-key control information;
a hardware-key function assignor that is arranged to determine a function to be assigned to said hardware-key based upon the first keyword and the second keywords of the hardware-key control information;
a hardware-key control unit that is arranged to control said hardware-key in accordance with the determination of the hardware-key function assignment by said hardware-key function assignor; and
a detection unit that is arranged to detect said state of the apparatus itself,
wherein said hardware-key control unit selects one of the plurality of functions defined by the second keywords, in response to the depressed hardware-key, based upon the reference condition and the state detected by said detection unit, and executes the selected function.

12. The image-processing apparatus according to claim 11, wherein said hardware-key function assignor determines the function to be assigned to the hardware-key based upon a URL of the page data.

13. The image-processing apparatus according to claim 11, wherein said sensor includes a sensor being arranged to detect at least one of existence and nonexistence of a placed document.

14. The image-processing apparatus according to claim 11, further comprising a guidance display generator that is arranged to generate a guidance display screen for explaining to the user the function assigned to said hardware-key unit as determined by said hardware-key function assignor and to display the guidance display screen on said user interface display unit.

15. The image-processing apparatus according to claim 11, wherein the text data is data described in a mark-up language.

16. The image-processing apparatus according to claim 15, wherein the text data is HTML data.

17. The image-processing apparatus according to claim 16, wherein the first keyword and the second keyword are described as a comment in a header portion of the HTML data.

18. The image-processing apparatus according to claim 15, wherein the text data is XHTML data.

19. The image-processing apparatus according to claim 18, wherein the first keyword is an attribute value of a predetermined tagged element and the second keyword is an attribute value of a predetermined tagged element.

* * * * *